United States Patent
Ge et al.

(10) Patent No.: US 9,720,880 B2
(45) Date of Patent: Aug. 1, 2017

(54) SYSTEM AND METHOD FOR AN ASYNCHRONOUS PROCESSOR WITH ASSISTED TOKEN

(71) Applicant: Huawei Technologies Co., Ltd., Shenzhen (CN)

(72) Inventors: Yiqun Ge, Kanata (CA); Wuxian Shi, Kanata (CA); Qifan Zhang, Lachine (CA); Tao Huang, Ottawa (CA); Wen Tong, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 341 days.

(21) Appl. No.: 14/480,562

(22) Filed: Sep. 8, 2014

(65) Prior Publication Data

US 2015/0074376 A1 Mar. 12, 2015

Related U.S. Application Data

(60) Provisional application No. 61/874,874, filed on Sep. 6, 2013.

(51) Int. Cl.
*G06F 15/82* (2006.01)
*G06F 9/30* (2006.01)
*G06F 9/38* (2006.01)

(52) U.S. Cl.
CPC ........ *G06F 15/825* (2013.01); *G06F 9/30058* (2013.01); *G06F 9/38* (2013.01);
(Continued)

(58) Field of Classification Search
CPC ...... G06F 15/825; G06F 9/30058; G06F 9/38; G06F 9/3842; G06F 9/3861; G06F 9/3869; G06F 9/3871
(Continued)

(56) References Cited

U.S. PATENT DOCUMENTS 5,850,542 A * 12/1998 Schroter ............... G06F 9/3804
 712/235
6,301,655 B1 * 10/2001 Manohar ............. G06F 9/30076
 712/244

(Continued)

FOREIGN PATENT DOCUMENTS

EP 0677807 B1 3/1999

OTHER PUBLICATIONS

Laurence, "Low-Power High-Performance Asynchronous General Purpose ARMv7 Processor for Multi-core Applications," presentation slides, 13th Int'l Forum on Embedded MPSoC and Multicore, Jul. 2013, Octasic Inc., 52 pages.*

(Continued)

*Primary Examiner* — Yuqing Xiao
(74) *Attorney, Agent, or Firm* — Slater Matsil, LLP

(57) ABSTRACT

Embodiments are provided for an asynchronous processor using master and assisted tokens. In an embodiment, an apparatus for an asynchronous processor comprises a memory to cache a plurality of instructions, a feedback engine to decode the instructions from the memory, and a plurality of XUs coupled to the feedback engine and arranged in a token ring architecture. Each one of the XUs is configured to receive an instruction of the instructions form the feedback engine, and receive a master token associated with a resource and further receive an assisted token for the master token. Upon determining that the assisted token and the master token are received in an abnormal order, the XU is configured to detect an operation status for the instruction in association with the assisted token, and upon determining a needed action in accordance with the operation status and the assisted token, perform the needed action.

24 Claims, 22 Drawing Sheets

(52) U.S. Cl.
CPC .......... *G06F 9/3842* (2013.01); *G06F 9/3861* (2013.01); *G06F 9/3869* (2013.01); *G06F 9/3871* (2013.01)

(58) Field of Classification Search
USPC .................................................. 712/25, 201
See application file for complete search history.

(56) References Cited

U.S. PATENT DOCUMENTS

| | | | | |
|---|---|---|---|---|
| 6,604,191 | B1* | 8/2003 | Flacks | G06F 9/3802 711/E12.02 |
| 7,010,675 | B2* | 3/2006 | Karim | G06F 9/3842 712/235 |
| 7,971,038 | B2* | 6/2011 | Wielage | G06F 7/00 326/93 |
| 2002/0156995 | A1 | 10/2002 | Martin et al. | |
| 2004/0111589 | A1* | 6/2004 | Lines | G06F 9/3836 712/215 |
| 2009/0119483 | A1* | 5/2009 | Singh | G06F 15/8053 712/36 |
| 2011/0078418 | A1 | 3/2011 | Rozas et al. | |
| 2012/0303933 | A1* | 11/2012 | Manet | G06F 15/17337 712/30 |

OTHER PUBLICATIONS

Laurence, "Introduction to Octasic Asynchronous Processor Technology," May 2012, IEEE 18th International Symposium on Asynchronous Circuits and Systems, pp. 113-117.*
International Search Report received in Application No. PCT/US2014/054621, mailed Nov. 19, 2014, 10 pages.

* cited by examiner

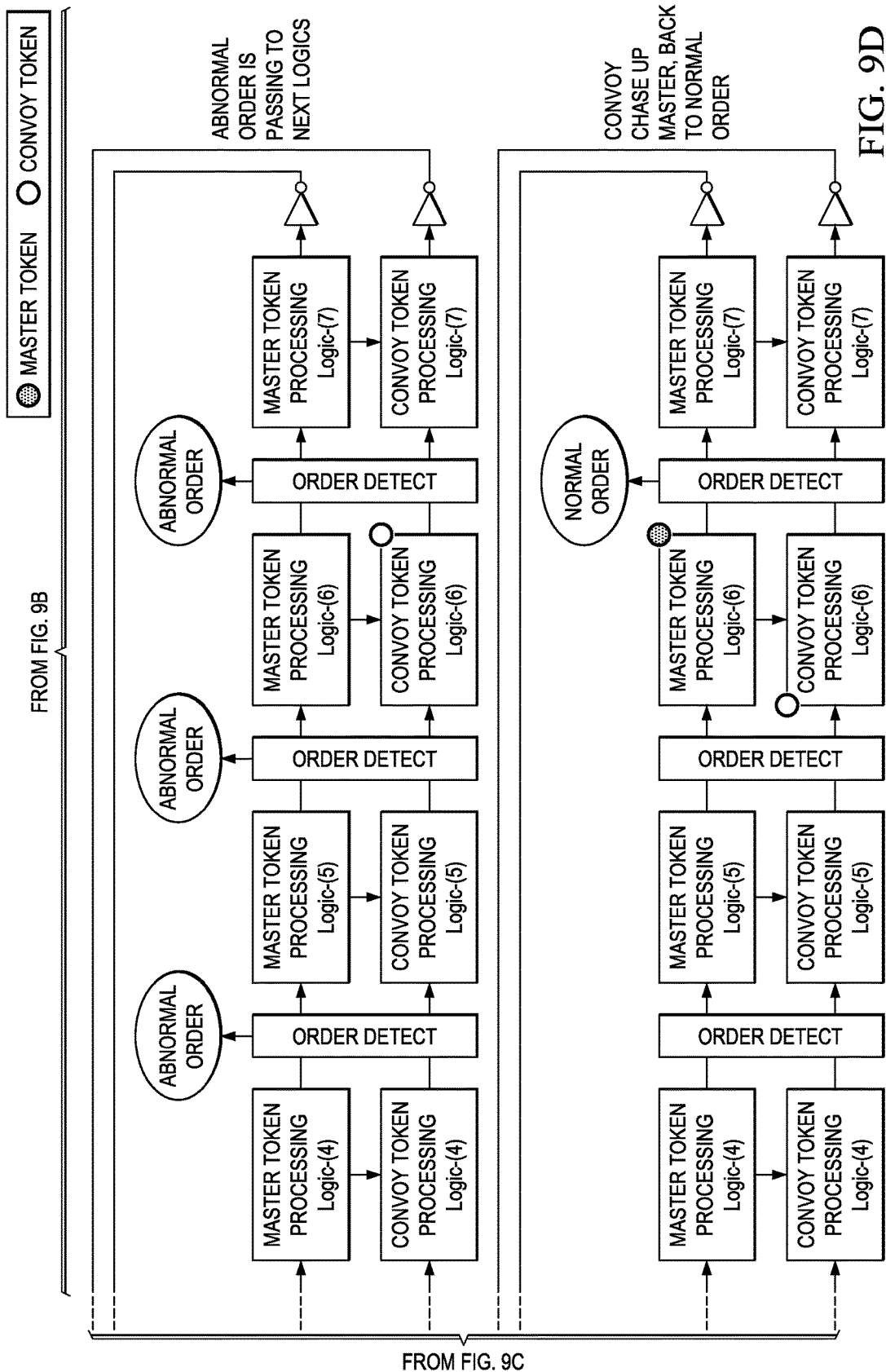

SYSTEM AND METHOD FOR AN ASYNCHRONOUS PROCESSOR WITH ASSISTED TOKEN

This application claims the benefit of U.S. Provisional Application No. 61/874,874 filed on Sep. 6, 2013 by Yiqun Ge et al. and entitled "Method and Apparatus for Asynchronous Processor with Assisted Token," which is hereby incorporated herein by reference as if reproduced in its entirety.

TECHNICAL FIELD

The present invention relates to asynchronous processing, and, in particular embodiments, to system and method for an asynchronous processor with assisted token.

BACKGROUND

Micropipeline is a basic component for asynchronous processor design. Important building blocks of the micropipeline include the RENDEZVOUS circuit such as, for example, a chain of Muller-C elements. A Muller-C element can allow data to be passed when the current computing logic stage is finished and the next computing logic stage is ready to start. Instead of using non-standard Muller-C elements to realize the handshaking protocol between two clockless (without using clock timing) computing circuit logics, the asynchronous processors replicate the whole processing block (including all computing logic stages) and use a series of tokens and token rings to simulate the pipeline. Each processing block contains a token processing logic to control the usage of tokens without time or clock synchronization between the computing logic stages. Thus, the processor design is referred to as an asynchronous or clockless processor design. The token ring regulates the access to system resources. The token processing logic accepts, holds, and passes tokens between each other in a sequential manner. When a token is held by a token processing logic, the block can be granted the exclusive access to a resource corresponding to that token, until the token is passed to a next token processing logic in the ring. There is a need for an improved asynchronous processor architecture which can handle instructions and processing resources with more efficiency.

SUMMARY OF THE INVENTION

In accordance with an embodiment, a method performed by an asynchronous processor includes receiving, at an execution unit (XU), a master token associated with a resource and further receiving an assisted token for the master token. Upon determining that the assisted token and the master token are received in an abnormal order, the XU detects an operation status at the XU in association with the assisted token, and upon determining a needed action in accordance with the operation status and the assisted token, performs the needed action.

In accordance with another embodiment, a method performed by an asynchronous processor includes performing a branch speculation at an XU, and receiving, at the XU, a program-counter (PC) jump token and a cancel branch speculation assisted token for the PC jump token. Upon determining that the cancel branch speculation assisted token is received in an abnormal order with the PC jump token, the XU detects whether the cancel branch speculation assisted token corresponds to the branch speculation, and upon determining the cancel branch speculation assisted token corresponds to the branch speculation, revokes the cancel branch speculation and fetches a new instruction at the XU.

In accordance with another embodiment, an apparatus for an asynchronous processor comprises a memory configured to cache a plurality of instructions, and a feedback engine coupled to the memory and configured to decode the instructions from the memory. The apparatus further comprises a plurality of XUs coupled to the feedback engine and arranged in a token ring architecture. Each one of the XUs is configured to receive an instruction of the instructions form the feedback engine, and receive a master token associated with a resource and further receive an assisted token for the master token. Upon determining that the assisted token and the master token are received in an abnormal order, the XU is configured to detect an operation status for the instruction in association with the assisted token, and upon determining a needed action in accordance with the operation status and the assisted token, perform the needed action.

In accordance with yet another embodiment, an apparatus for an asynchronous processor comprises a memory configured to cache a plurality of instructions, and a feedback engine coupled to the memory and configured to decode the instructions from the memory. The apparatus also comprises a plurality of XUs coupled to the feedback engine and arranged in a token ring architecture. Each one of the XUs is configured to receive an instruction of the instructions form the feedback engine, perform a branch speculation related to the instruction, and receive a PC jump token and a cancel branch speculation assisted token for the PC jump token. Upon determining that the cancel branch speculation assisted token is received in an abnormal order with the PC jump token, the XU is configured to detect whether the cancel branch speculation assisted token corresponds to the branch speculation, and upon determining the cancel branch speculation assisted token corresponds to the branch speculation, revoke the branch speculation and fetch a new instruction.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
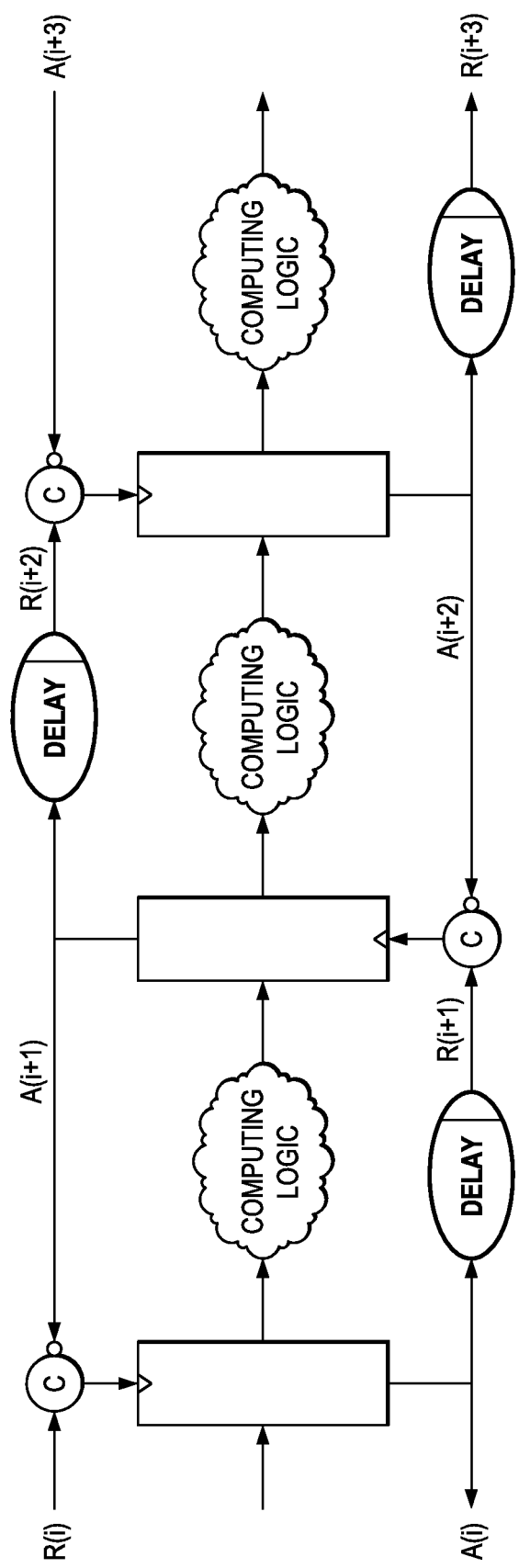
FIG. 1 illustrates a Sutherland asynchronous micropipeline architecture.

FIG. 1 illustrates a Sutherland asynchronous micropipeline architecture. The Sutherland asynchronous micropipeline architecture is one form of asynchronous micropipeline architecture that uses a handshaking protocol to operate the micropipeline building blocks. The Sutherland asynchronous micropipeline architecture includes a plurality of computing logics linked in sequence via flip-flops or latches. The computing logics are arranged in series and separated by the latches between each two adjacent computing logics. The handshaking protocol is realized by Muller-C elements (labeled C) to control the latches and thus determine whether and when to pass information between the computing logics. This allows for an asynchronous or clockless control of the pipeline without the need for timing signal. A Muller-C element has an output coupled to a respective latch and two inputs coupled to two other adjacent Muller-C elements, as shown. Each signal has one of two states (e.g., 1 and 0, or true and false). The input signals to the Muller-C elements are indicated by A(i), A(i+1), A(i+2), A(i+3) for the backward direction and R(i), R(i+1), R(i+2), R(i+3) for the forward direction, where i, i+1, i+2, i+3 indicate the respective stages in the series. The inputs in the forward direction to Muller-C elements are delayed signals, via delay logic stages The Muller-C element also has a memory that stores the state of its previous output signal to the respective latch. A Muller-C element sends the next output signal according to the input signals and the previous output signal. Specifically, if the two input signals, R and A, to the Muller-C element have different state, then the Muller-C element outputs A to the respective latch. Otherwise, the previous output state is held. The latch passes the signals between the two adjacent computing logics according to the output signal of the respective Muller-C element. The latch has a memory of the last output signal state. If there is state change in the current output signal to the latch, then the latch allows the information (e.g., one or more processed bits) to pass from the preceding computing logic to the next logic. If there is no change in the state, then the latch blocks the information from passing. This Muller-C element is a non-standard chip component that is not typically supported in function libraries provided by manufacturers for supporting various chip components and logics. Therefore, implementing on a chip the function of the architecture above based on the non-standard Muller-C elements is challenging and not desirable.

Figure 2:
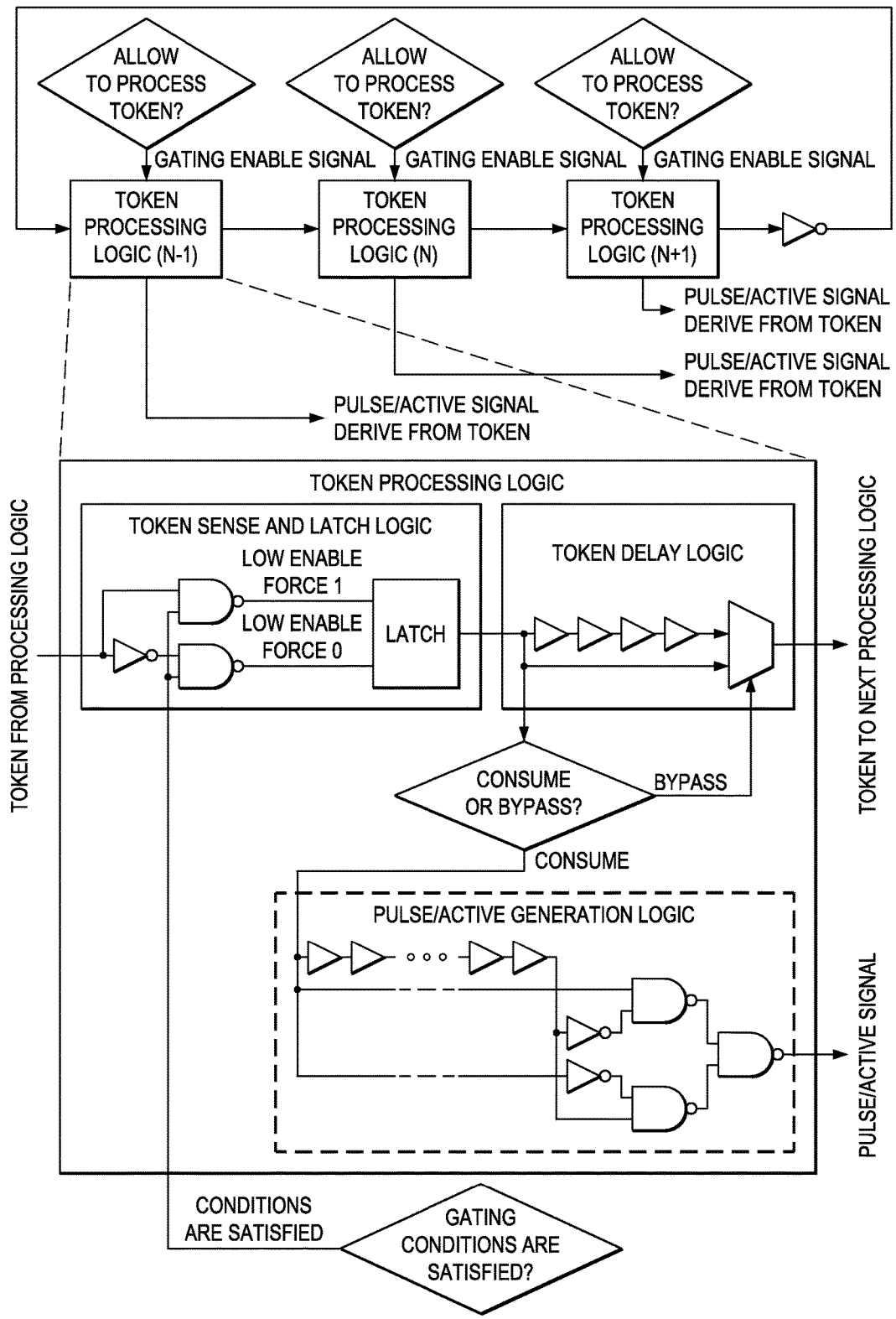
FIG. 2 illustrates a token ring architecture.

FIG. 2 illustrates an example of a token ring architecture which is a suitable alternative to the architecture above in terms of chip implementation. The components of this architecture are supported by standard function libraries for chip implementation. As described above, the Sutherland asynchronous micropipeline architecture requires the handshaking protocol, which is realized by the non-standard Muller-C elements. In order to avoid using Muller-C elements (as in FIG. 1), a series of token processing logics are used to control the processing of different computing logics (not shown), such as processing units on a chip (e.g., ALUs) or other functional calculation units, or the access of the computing logics to system resources, such as registers or memory. To cover the long latency of some computing logics, the token processing logic is replicated to several copies and arranged in a series of token processing logics, as shown. Each token processing logic in the series controls the passing of one or more token signals (associated with one or more resources). A token signal passing through the token processing logics in series forms a token ring. The token ring regulates the access of the computing logics (not shown) to the system resource (e.g., memory, register) associated with that token signal. The token processing logics accept, hold, and pass the token signal between each other in a sequential manner. When a token signal is held by a token processing logic, the computing logic associated with that token processing logic is granted the exclusive access to the resource corresponding to that token signal, until the token signal is passed to a next token processing logic in the ring. Holding and passing the token signal concludes the logic's access or use of the corresponding resource, and is referred to herein as consuming the token. Once the token is consumed, it is released by this logic to a subsequent logic in the ring.

Figure 3:
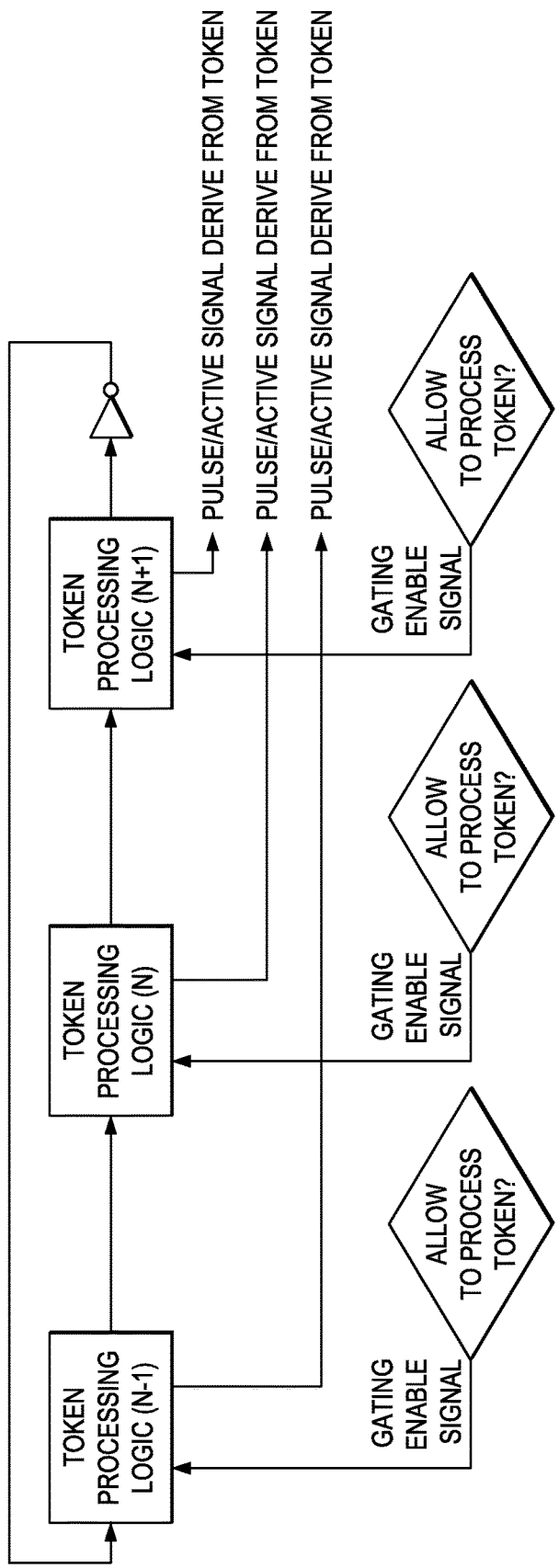
FIG. 3 illustrates a token ring based control logic.

FIG. 3 illustrates an example of a token ring based control logic, which is part of the token ring architecture above. According to this logic, the token ring consists of a cascade (series) of token processing logics and an inverter. The token processing logics process a token signal as discussed above. The inverter simply inverts the state (e.g., from 0 to 1, or 1 to 0) of the token signal from the last token processing logic before sending the inverted token signal back to the start of the ring. The token signal is referred to as an edge signal that passes through one token processing logic to the next. Additionally, an external enable signal controls when to process an incoming token signal at each token processing logic. Further, a pulse or active signal is generated from each token processing logic according to the processing of its incoming token signal, where the token signal can suffer from certain processing latency when going through a token processing logic. The pulse signal is sent from a token processing logic to a corresponding computing logic (not shown) to control, start, or allow the computing logic access to a resource associated with the token signal.

Figure 4:
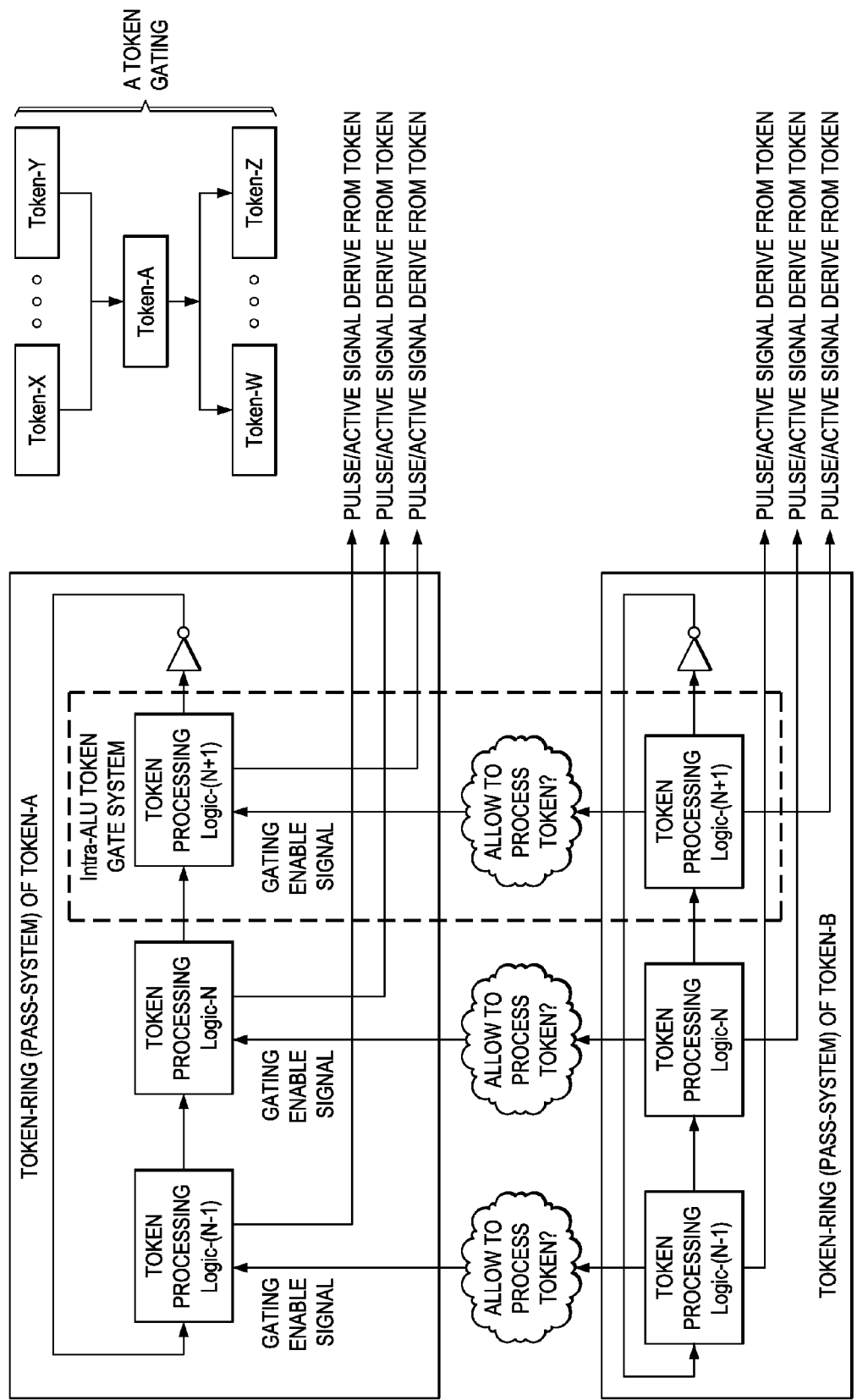
FIG. 4 illustrates a token gate system.

FIG. 4 illustrates a token gate system where releasing each token in the token system gates the processing of a corresponding token in the system at the same ALU (intra-ALU token gate system). Specifically, designated tokens are used to gate other designated tokens in a given order for gating and passing the tokens through the ALUs. The gating process means that when a designated token passes through an ALU, a second designated token is then allowed to be processed and passed by the same ALU in the token ring architecture. In other words, releasing one token by the ALU becomes a condition to consume (process) another token in that ALU in that given order. In this example, the token gating system includes two token rings that pass across the logics (or ALUs): a token ring for passing token-A, and another token ring for passing token-B. Releasing token-B gates (is a condition to allow consuming) token-A for each token processing logic (e.g., ALU). FIG. 4 also shows a cascade of tokens in the token gating system according to a predefined gating and passing order of the tokens through the ALUs. For example, token-X and token-Y gate token-A, and token-A gates token-W and token-Z.

Figure 5:
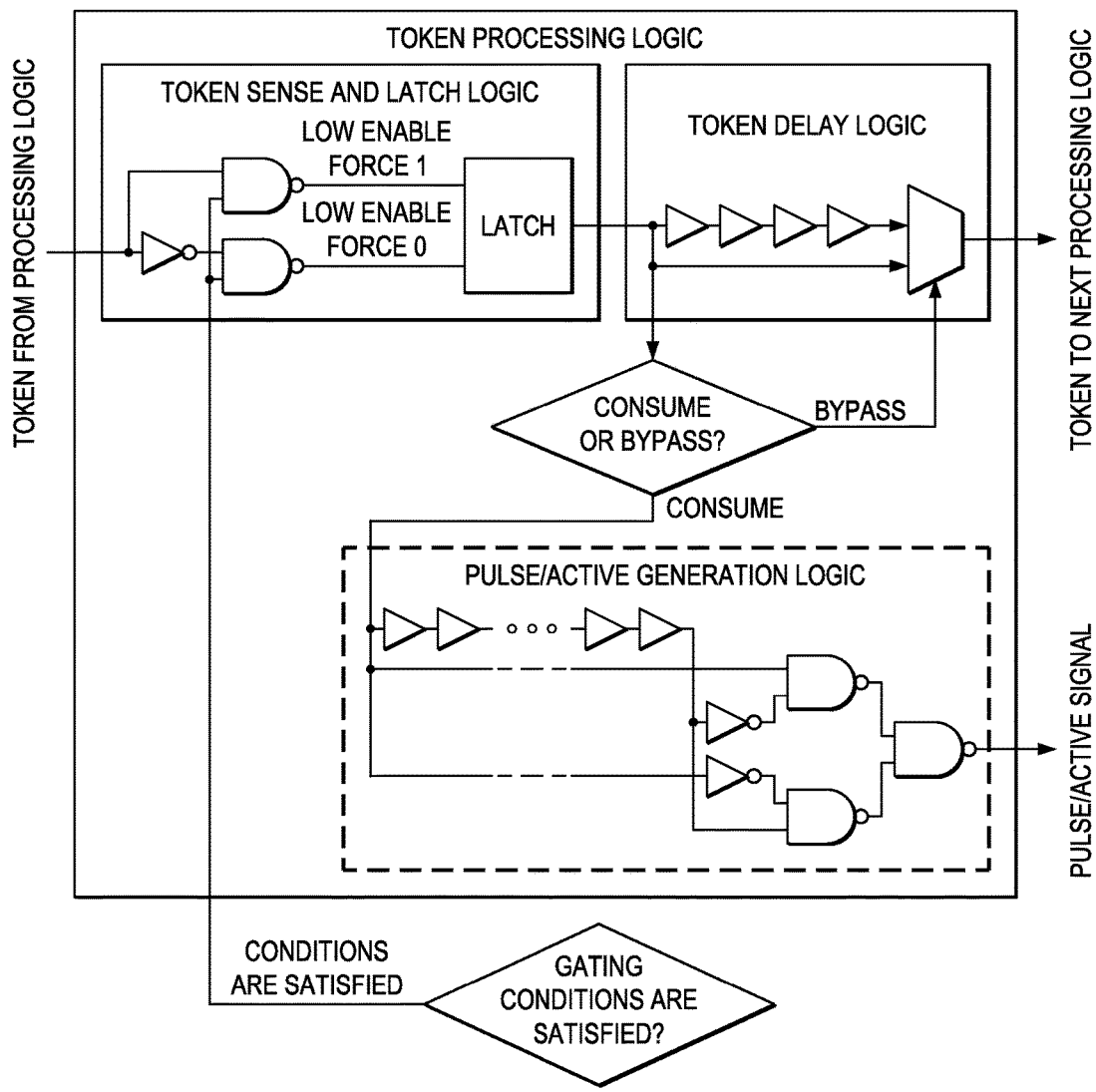
FIG. 5 illustrates a token processing logic.
Figure 9:
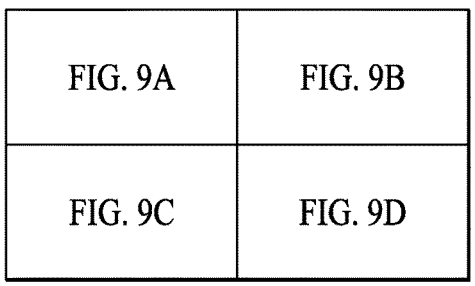
FIGS. 9A-9D illustrate an example of an order recovery scenario in accordance with an embodiment.
Figure 10:
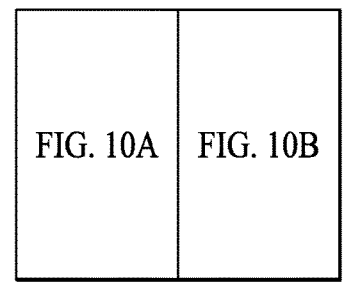
FIGS. 10A and 10B illustrate an example of a flush penalty scenario.

FIG. 5 illustrates a token processing logic, as part of the token ring architecture. The token processing logic can be implemented in an arithmetic and logic unit (ALU) of an asynchronous processor. A token processing logic within an ALU can be abstracted into 3 logics: token sense & latch logic, token delay logic, and pulse/active signal generation logic.

Figure 6:
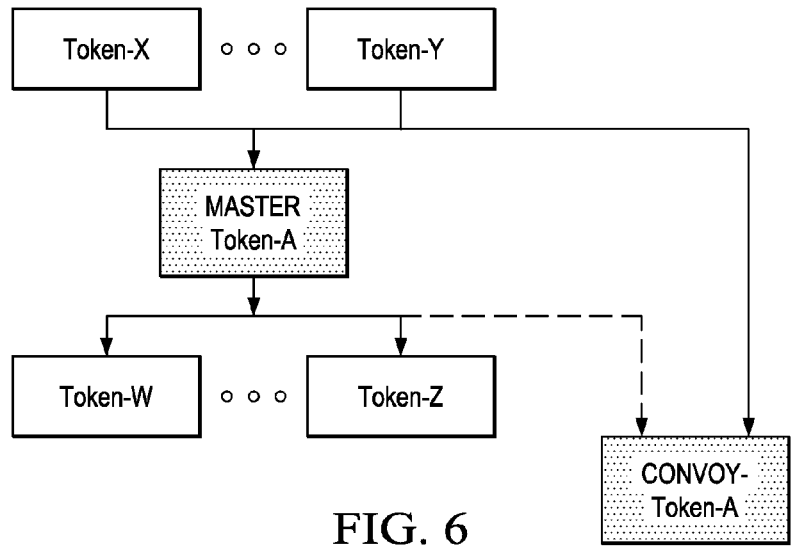
FIG. 6 illustrates an embodiment of assisted token gating.

FIG. 6 illustrates an embodiment of assisted token gating. In a normal order of token passing, a master token-A is received at an ALU before assisted token-A. In an abnormal order of token passing, the assisted token-A is received at an ALU before the master token-A. The assisted token is gated by the same conditions as its master token. If the assisted token is disabled, it is also gated by its master token. Hence, the assisted token is received at an ALU after its master token (the normal order is kept). If the assisted token is enabled (abnormal order), it is not gated by its master token until a normal order is recovered.

The token system conveys some information by gating and passing among tokens. Using gating, one operation is finished clearly and a next operation can be started. Using passing, one common resource is accessed clearly and a next request can be sent for it. Tokens are used for avoiding the mesa-stability of the clockless (asynchronous) circuit, avoiding the structural hazard (resource conflict), and preserving the program order. Conveying more information using the token system and using the tokens for other functionality is useful and desired.

Figure 7:
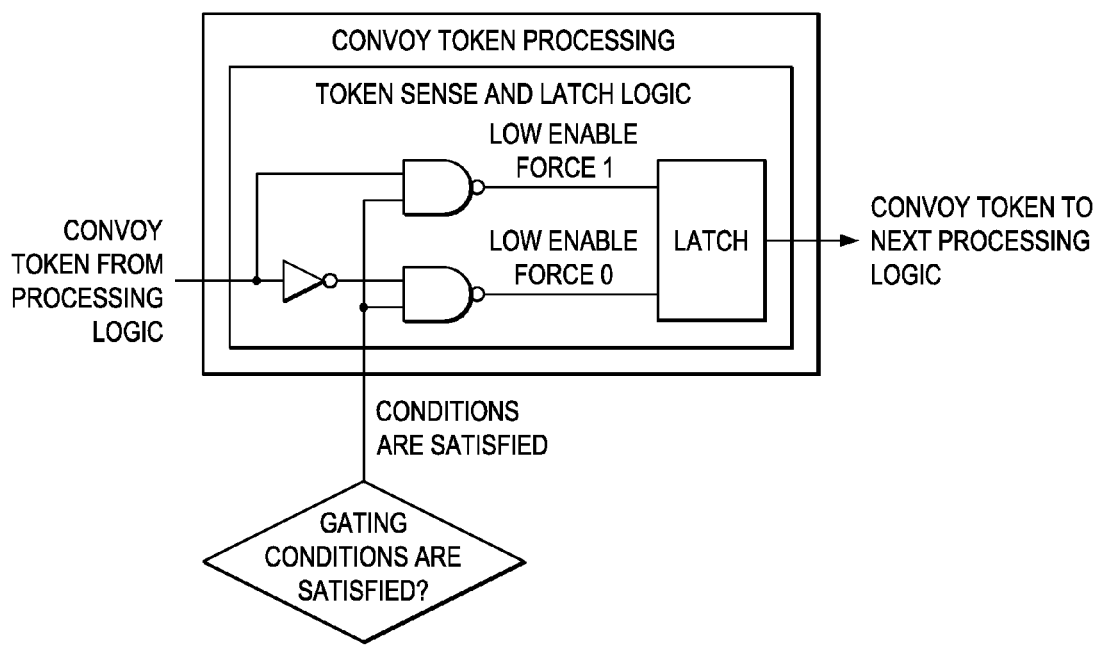
FIG. 7 illustrates an embodiment of an assisted token processing logic.
Figure 11:
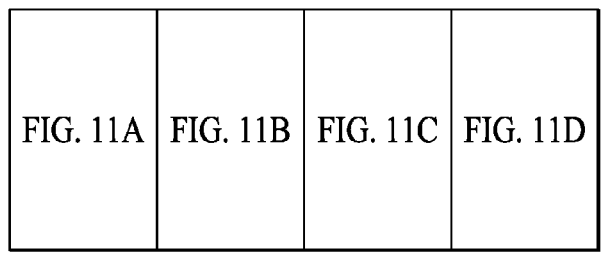
FIGS. 11A-11D illustrate another example of a flush penalty scenario.

FIG. 7 illustrates an embodiment of an assisted token processing logic. According to this logic, once an assisted token is allowed, it is released immediately. This is implemented to minimize the assisted token latency if it is used. The assisted token does not generate any pulse or active signals. The assisted token also does not indicate any exclusive access to a resource (e.g., a register, buffer, file, predictor), and does not generate any clock-on-demand.

Figure 8:
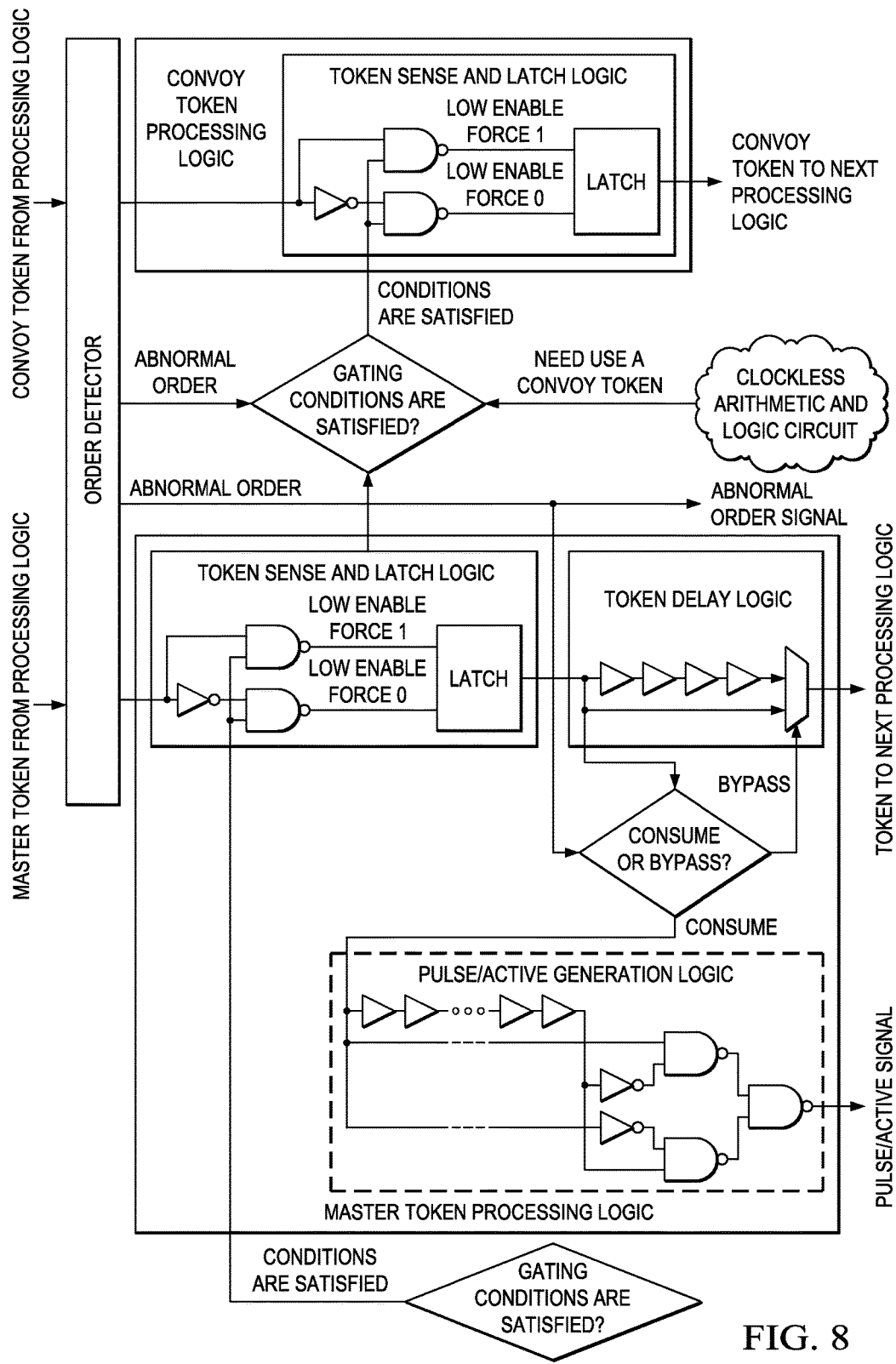
FIG. 8 illustrates an embodiment of using master and assisted token processing logics.
Figure 9A:
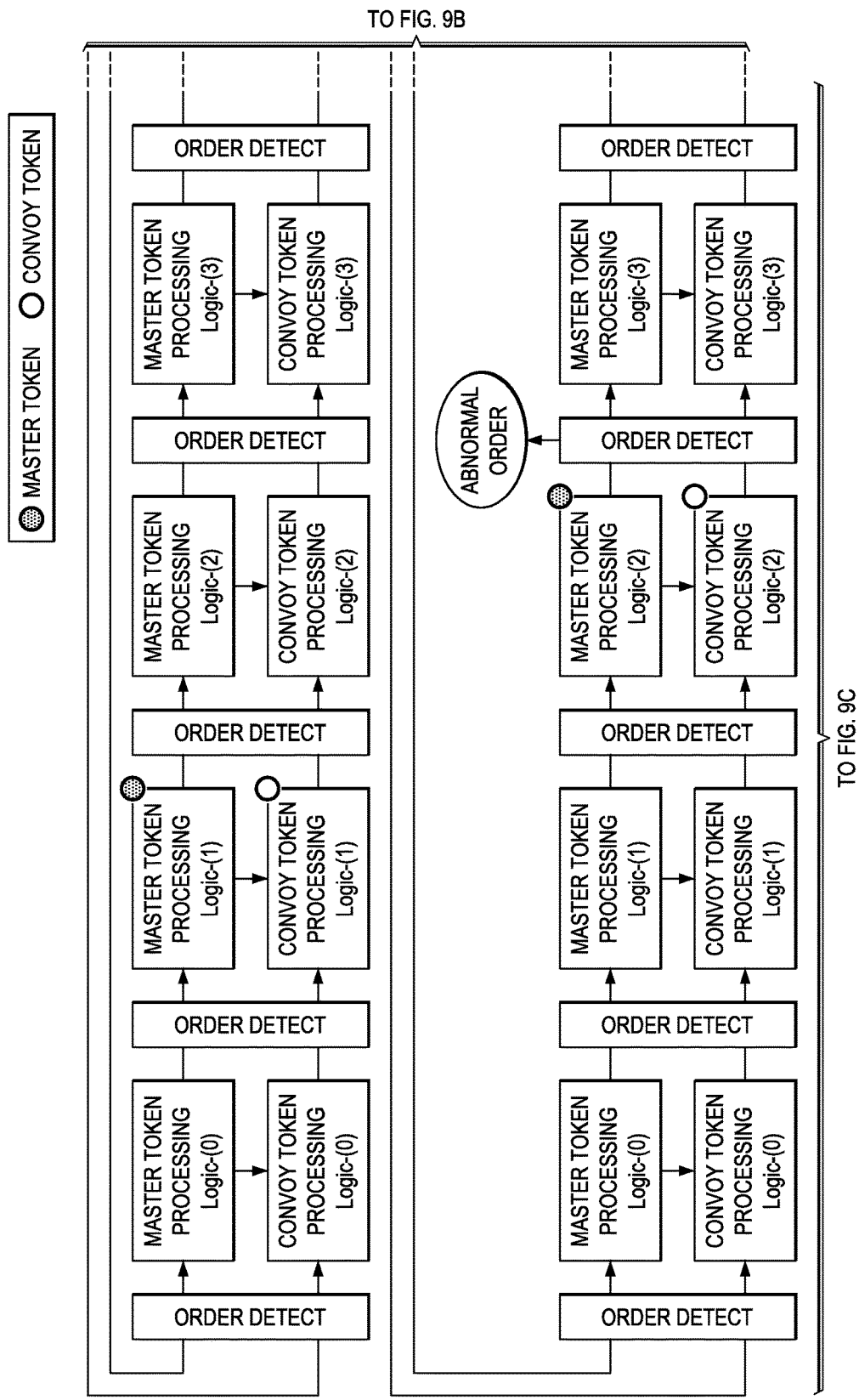
Figure 9B:
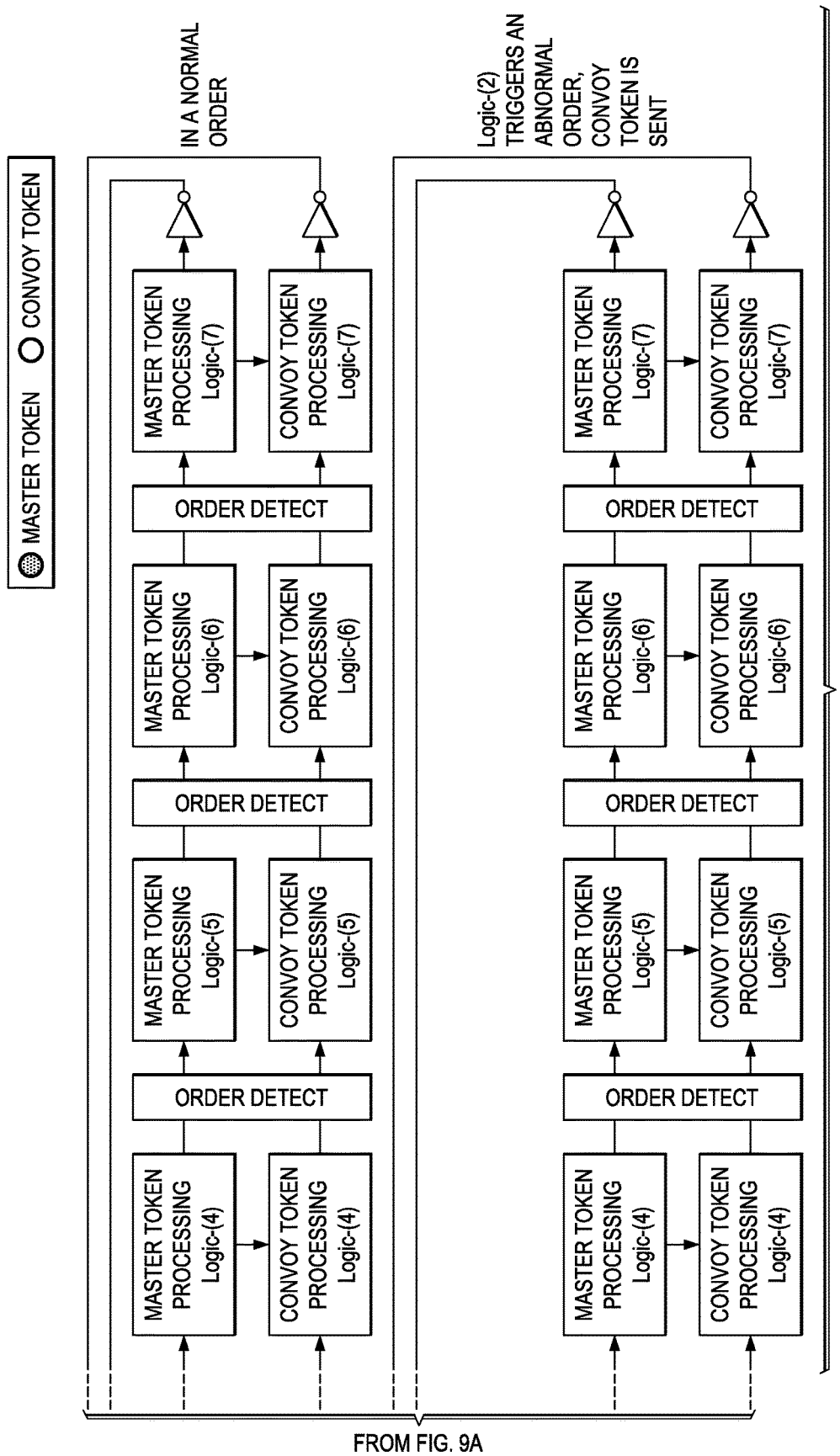
Figure 9C:
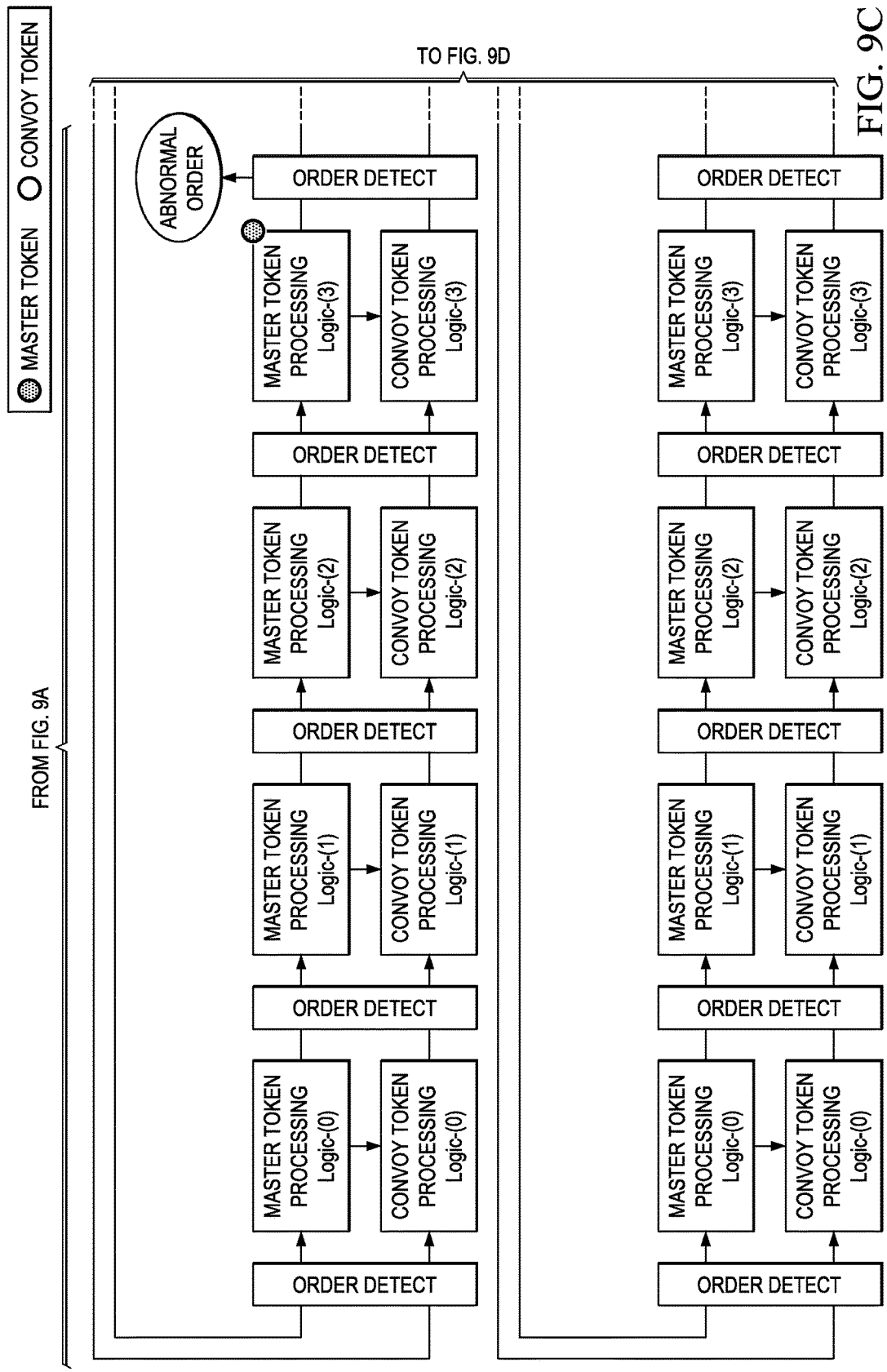

FIG. 8 illustrates an embodiment of using master and assisted token processing logics. An order-detect logic detects an abnormal order, that is, the assisted token, also referred to herein as convoy token, comes earlier than the master token. If an abnormal order is detected, the convoy token is released earlier than the master token (keeping this abnormal order). Further, ALU is informed of this abnormal situation. If a normal order is detected, the convoy token is held until the master token is released (keeping this normal order). Alternatively, if the ALU decides to use this convoy token, the convoy token is passed earlier than the master token (starting an abnormal order).

FIGS. 9A-9D illustrate an example of an order recovery scenario in accordance with an embodiment. In a normal order, the master token comes from logic-(1) earlier than the assisted or convoy token. Next, logic-(2) triggers an abnormal order, and sends the convoy order first. The abnormal order (convoy token first) passes to the next logics in the pipeline. The convoy is then passed through the token logics to chase up to the master, by looping back the token ring (a roundabout on the token ring), to return back to normal order.

Among the benefits of this assisted token processing logic, a token logic-(N) can pass certain information to the next token logics-(N+x), where N and x are integers. Meanwhile, this issuing token logic-(N) does not install itself (it undoes its calculation). In an abstract application scenario, the token logic-N meets a situation and needs to inform some other token-logics of the situation. Hence, the token logic-(N) sends an assisted token (abnormal order), as a protocol to indicate the situation to next logic. Any other token-logics that know this protocol can react properly to this abnormal order.

Figure 10A:
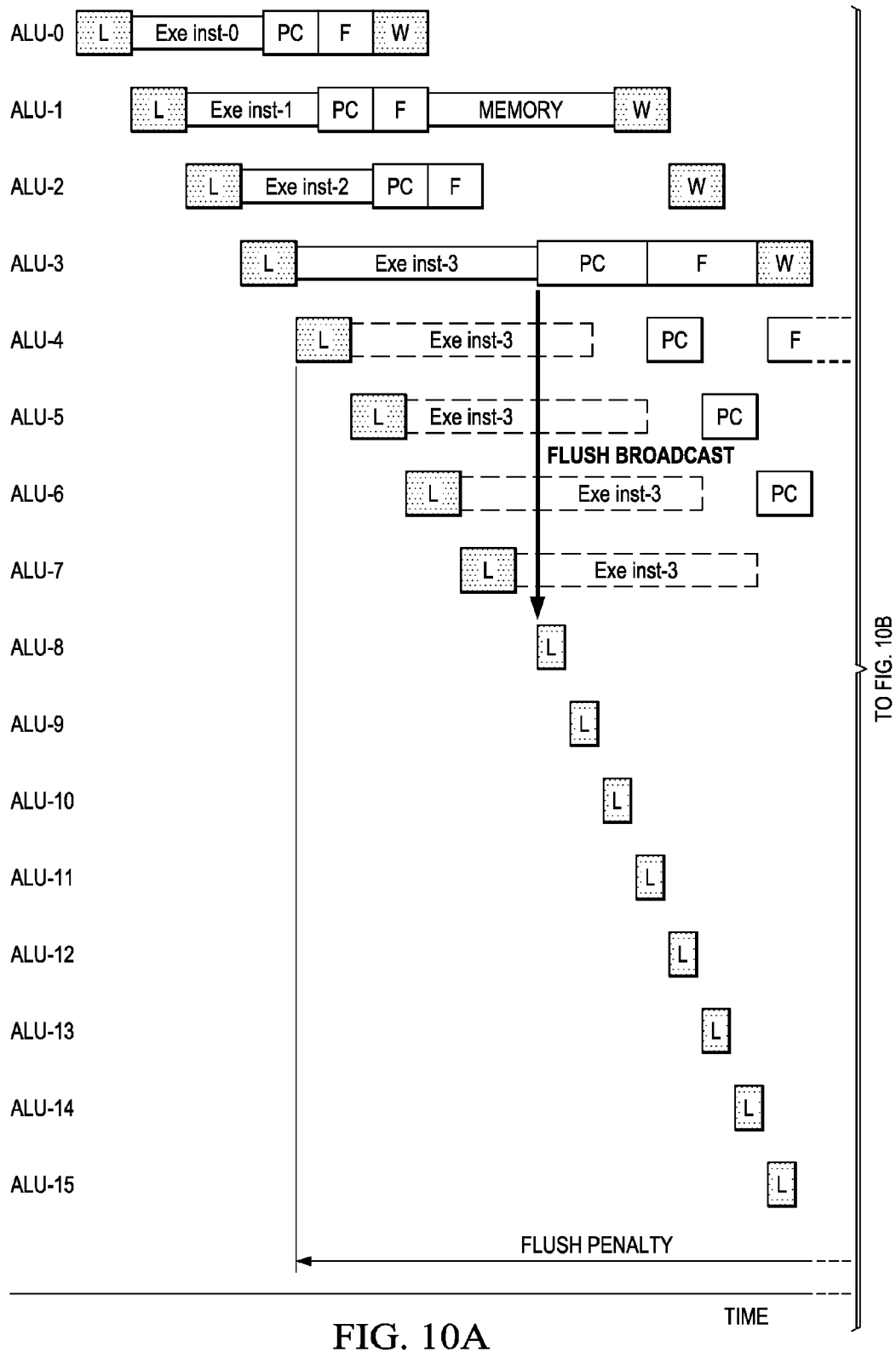
Figure 10B:
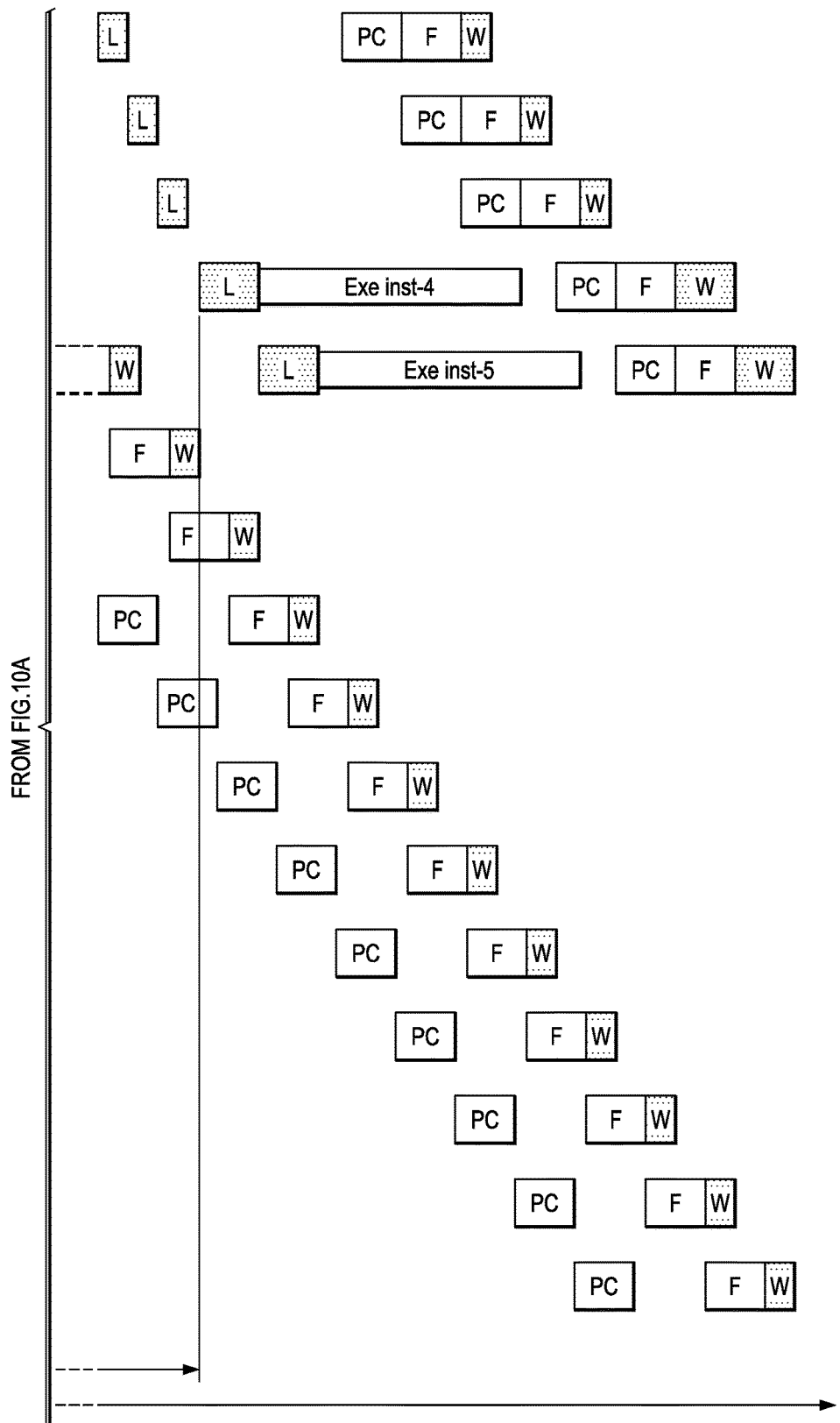
Figure 11A:
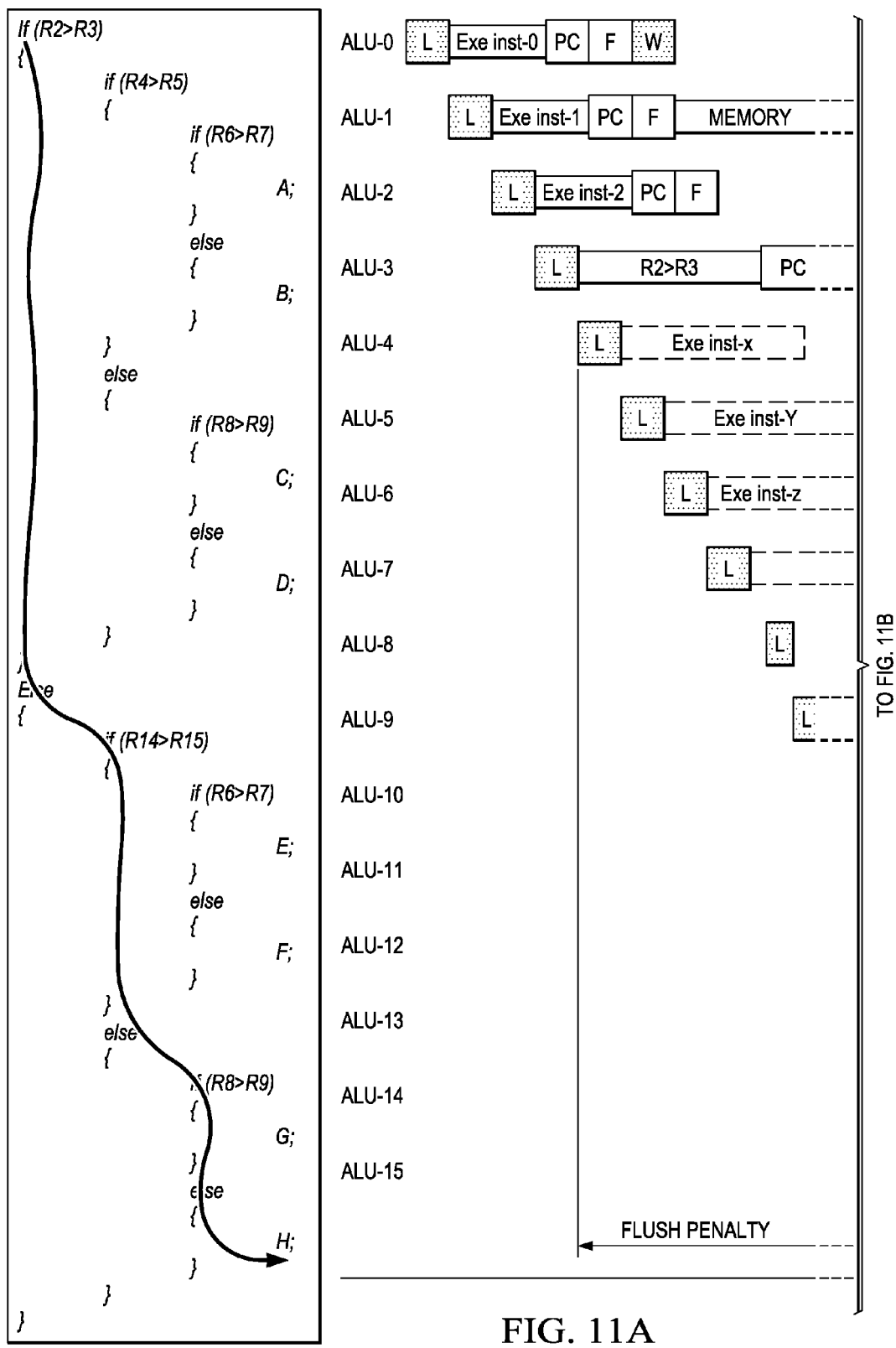
Figure 11B:
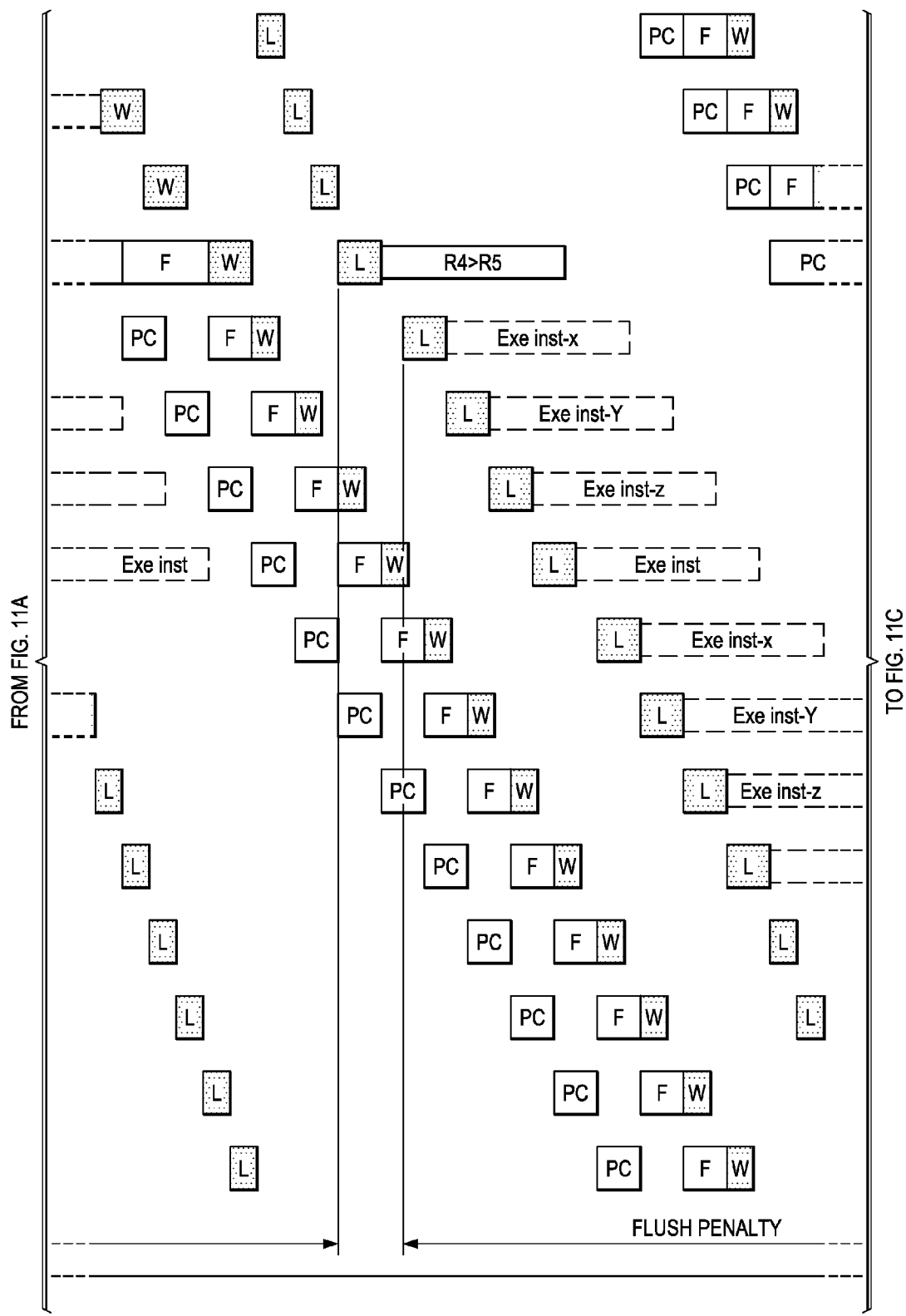
Figure 11C:
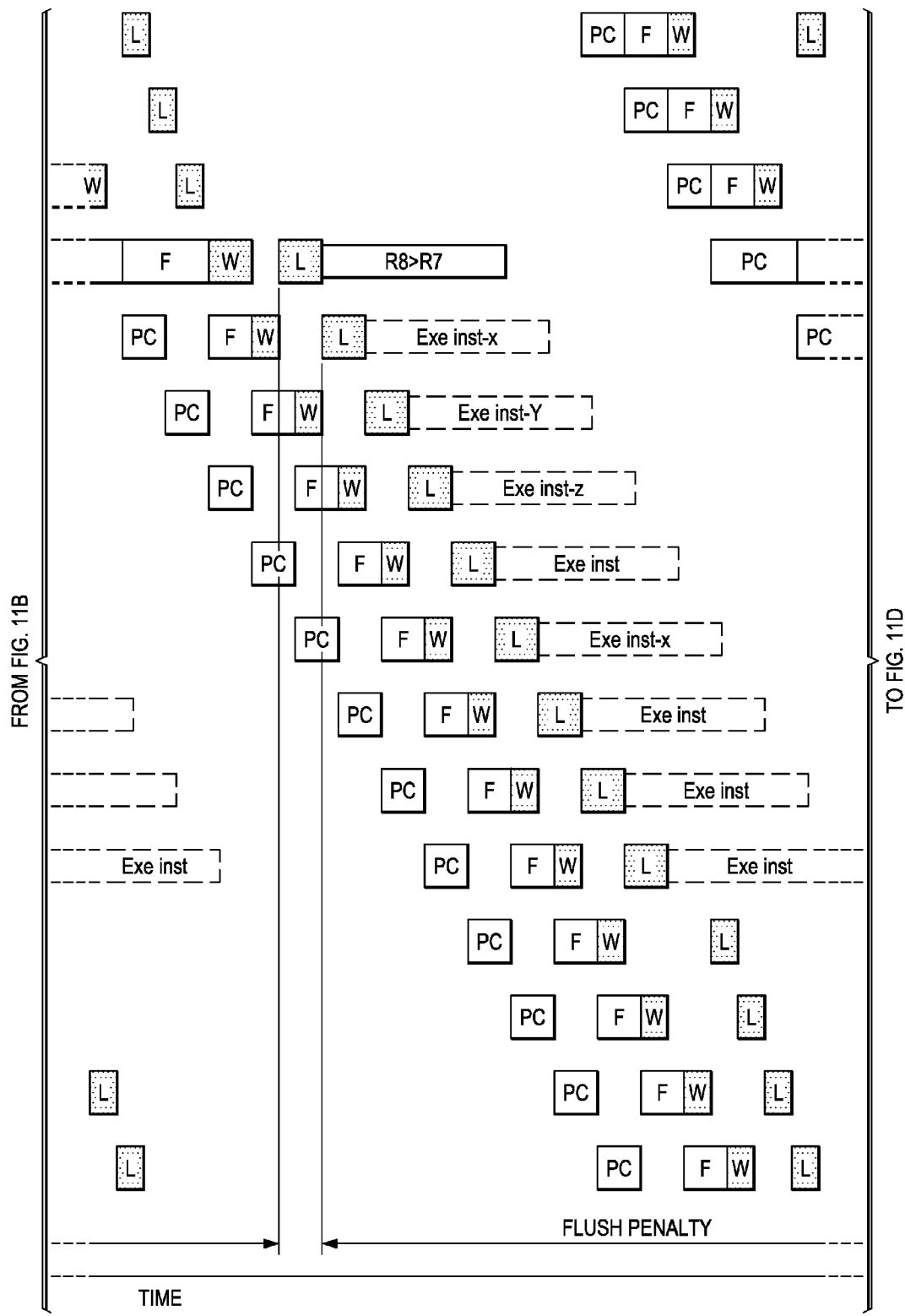
Figure 11D:
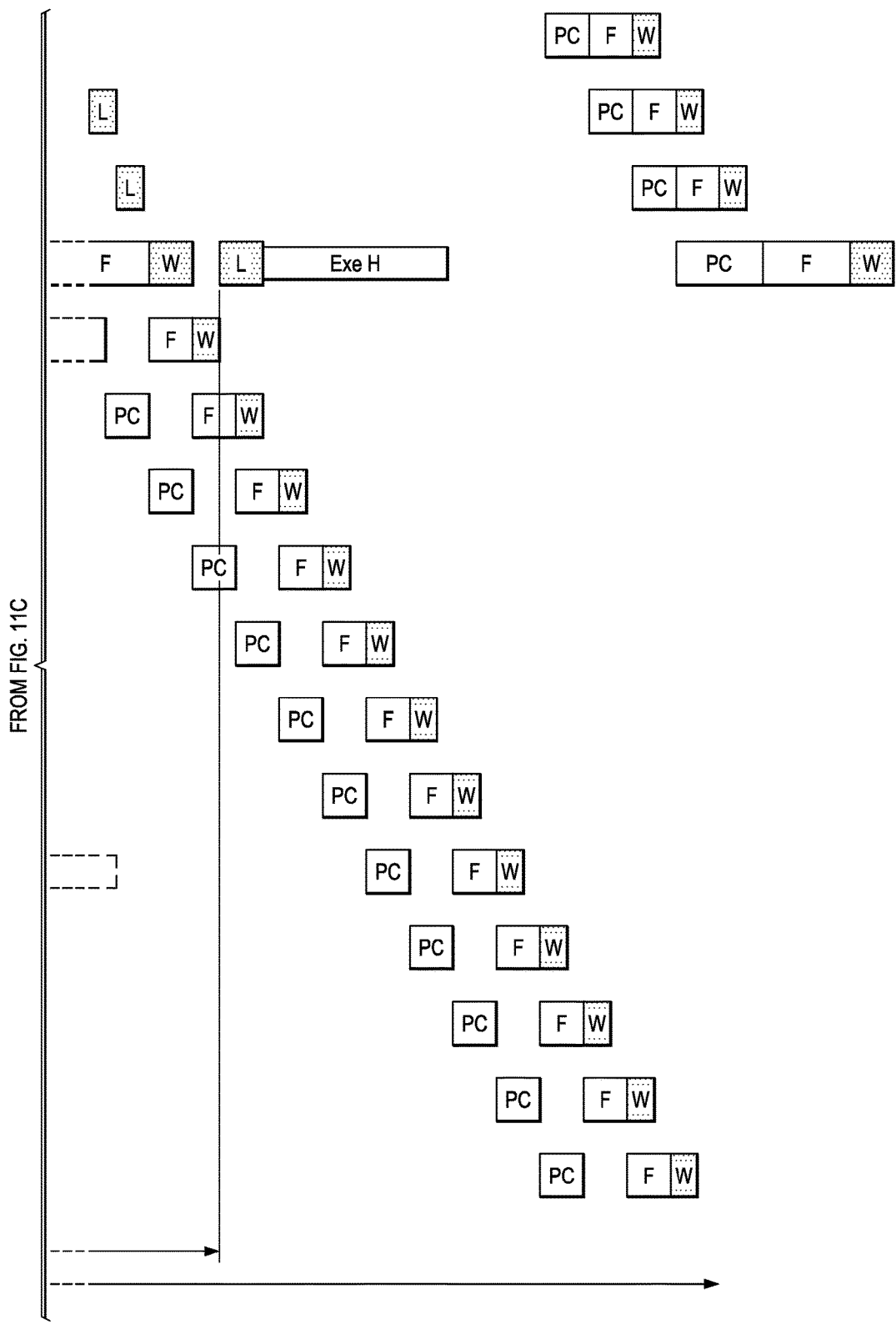

FIGS. 10A and 10B illustrate an example of a flush penalty scenario. The flush penalty is implemented to remove a branch speculation. A branch speculation is made before waiting for calculation results of a condition (e.g., if-then-else statement) that determines one of two (or more) possible branches of actions to take. Speculation is performed to save processing time, where the ALU speculates which branch to take prior to waiting for the results and thus knowing the correct branch. the speculation can be made based on historical data, for instance, or other criteria. When the results are obtained, the execution of the branch speculation is kept if the branch speculation is found to be the correct branch according to the results. Otherwise, the branch speculation is flushed (its calculations and results erased), the correct branch is recalculated. FIGS. 11A-11D illustrate another example of a flush penalty scenario. In this scenario, another flush may take place after one flush is clearly finished. This is the situation when multiple conditions are nested (e.g., nested if-then-else statements) and the corresponding nested branch speculations need to be flushed when the results that determine the correct nested branches are obtained. The penalty for such nested branch speculations is even greater than for a single branch speculation, e.g., in term of computation time.

Figure 12:
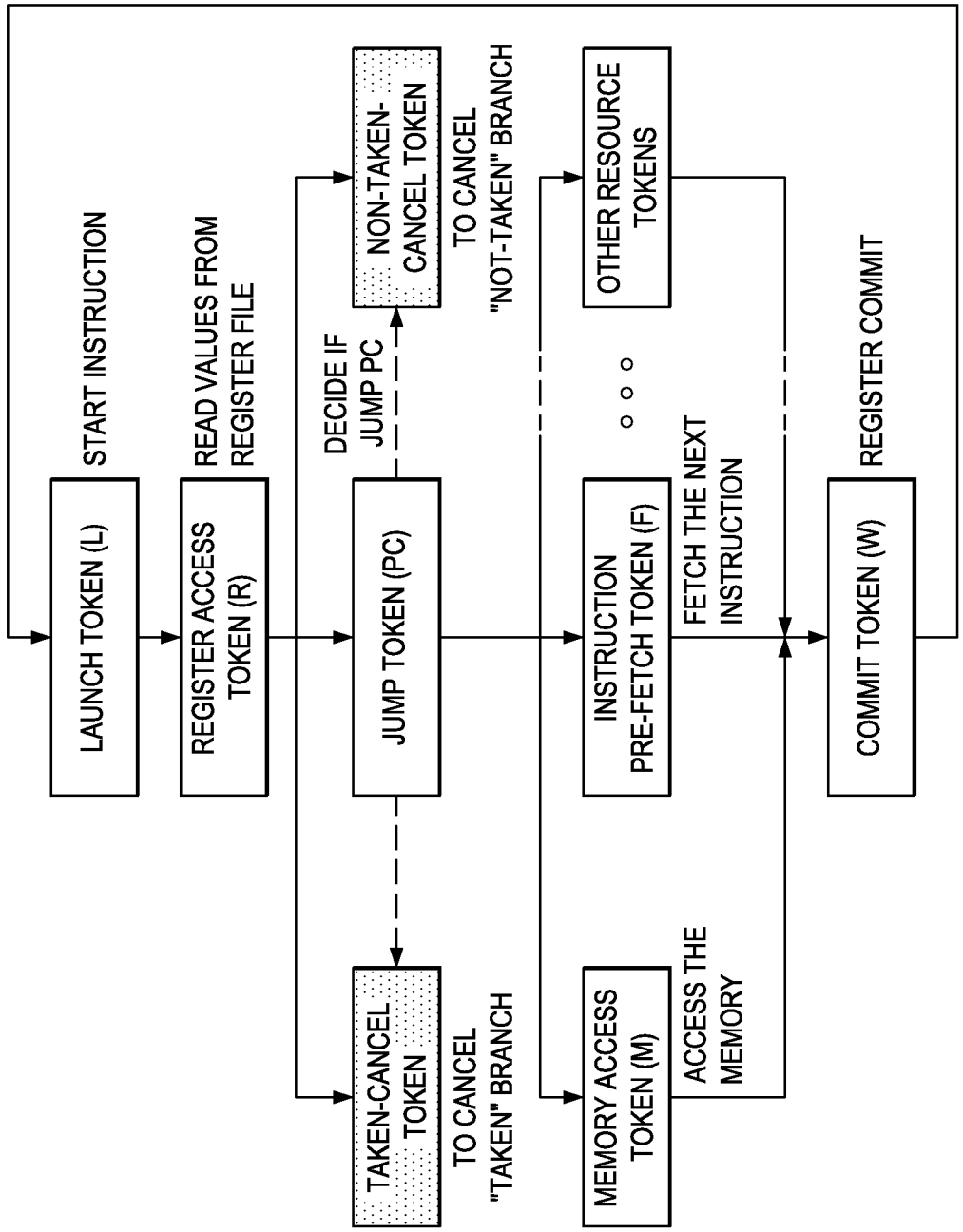
FIG. 12 illustrates of a taken and non-taken assisted tokens attached to a program-counter (PC) jump token in accordance with an embodiment.

FIG. 12 illustrates of a taken and non-taken cancel tokens associated with a program-counter (PC) jump token in accordance with an embodiment. The taken-cancel token and the non-taken cancel token are assisted tokens to the PC jump token which is the master token. If a branch is taken (e.g., path A is taken), then the non-taken cancel token is sent, as a protocol, to next logics to cancel the non-taken branch (e.g., cancel path B). Alternatively, if a branch is not taken (path B is taken), then the taken-cancel token is sent to cancel the taken branch (cancel path A).

Figure 13:
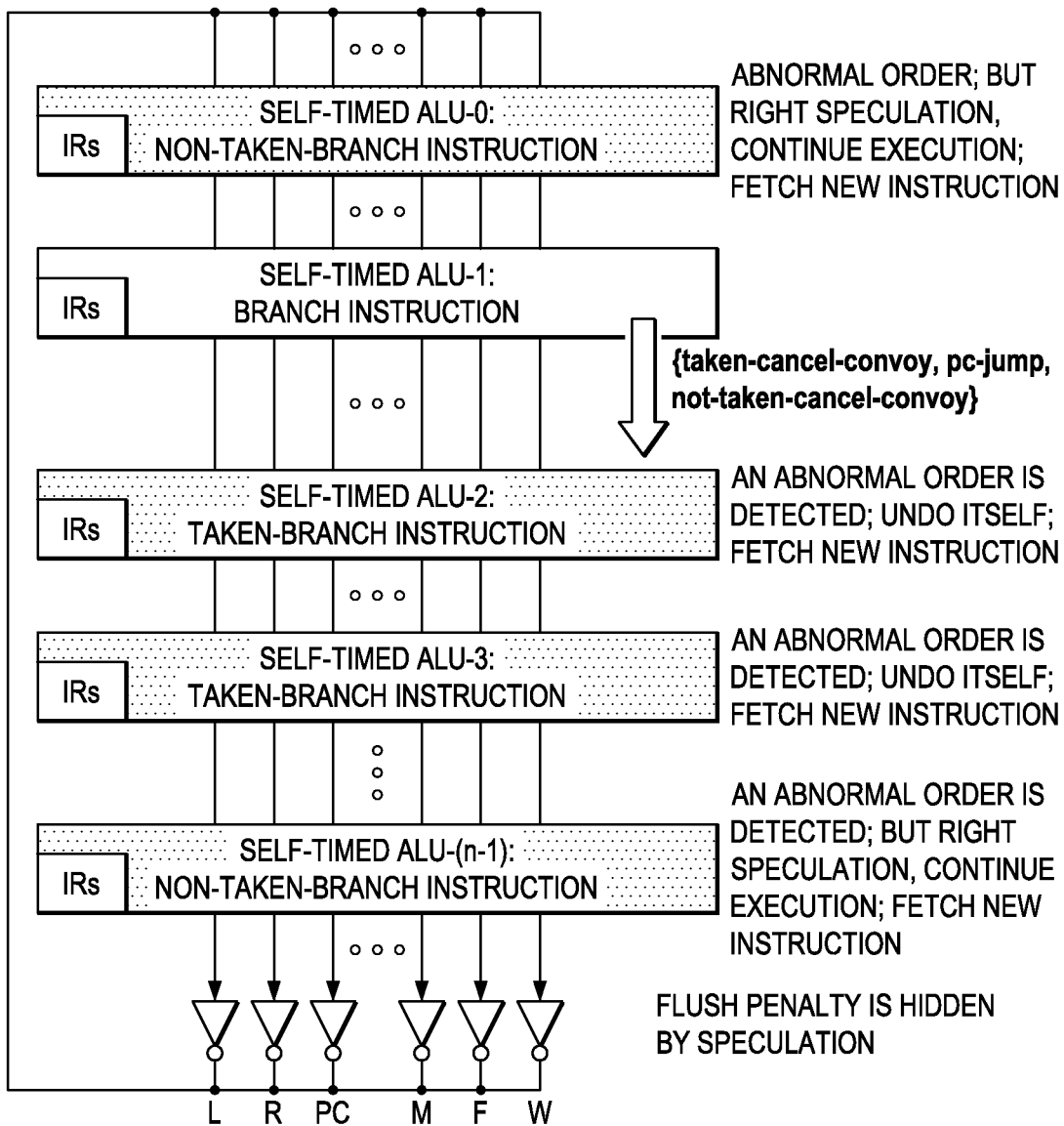
FIG. 13 illustrates an example of revoking incorrect speculation in accordance with an embodiment.

FIG. 13 illustrates an example of revoking incorrect speculation in accordance with an embodiment. At ALU-1, a branch instruction is executed. A decision is made, where the non-taken branch is found to be the correct branch. Hence, the ALU sends a taken-cancel assisted token to indicate to next ALUs to cancel the taken branch. The ALU also fetches a new instruction. At the next ALU (ALU-2), the taken branch instruction is executed speculatively (before waiting for calculation results from ALU-1 that determines which correct branch to take), and the abnormal order is detected (the taken-cancel token is received or detected in order before the PC jump token). Since the assisted token is the taken-cancel token and performed the branch speculation is for the taken branch, this causes the ALU to undo its operation and fetch a new instruction. At ALU-3, the taken branch instruction is also executed speculatively, and the abnormal order is detected. The same situation of ALU-2 is repeated at ALU-3, which also causes ALU-3 to undo itself and fetch a new instruction. At ALU-(n−1) and ALU-0, non-taken branch instructions are executed speculatively. These ALUs detects an abnormal order and a surely-correct speculation is made (the correct non-taken branch is executed). Hence, ALU-(n−1) and ALU-0 continue execution and fetch a new instruction. In this scheme, the flush penalty is hidden or reduced in the ring of ALUs by speculation.

Figure 14:
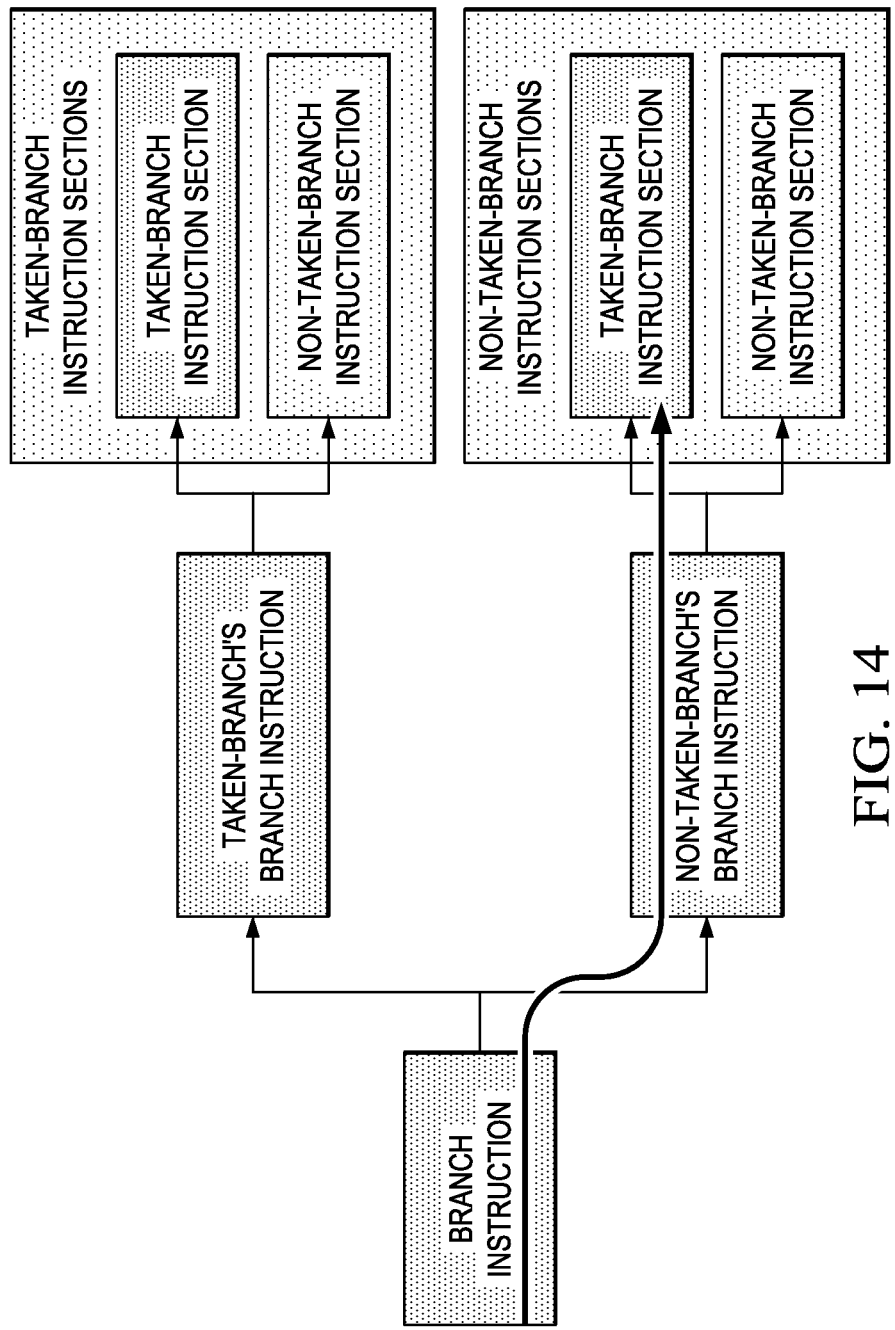
FIG. 14 illustrates an embodiment of a two level branch speculation over speculation.

FIG. 14 illustrates an embodiment of a two level branch speculation over speculation. In each branch level, an operation similar to the operation shown in FIG. 12 takes place. At each of the first branch level and the second branch level in FIG. 14, if a branch is taken, then the non-taken cancel assisted token is sent. Alternatively, if a branch is not taken, then the taken-cancel assisted token is sent.

Figure 15:
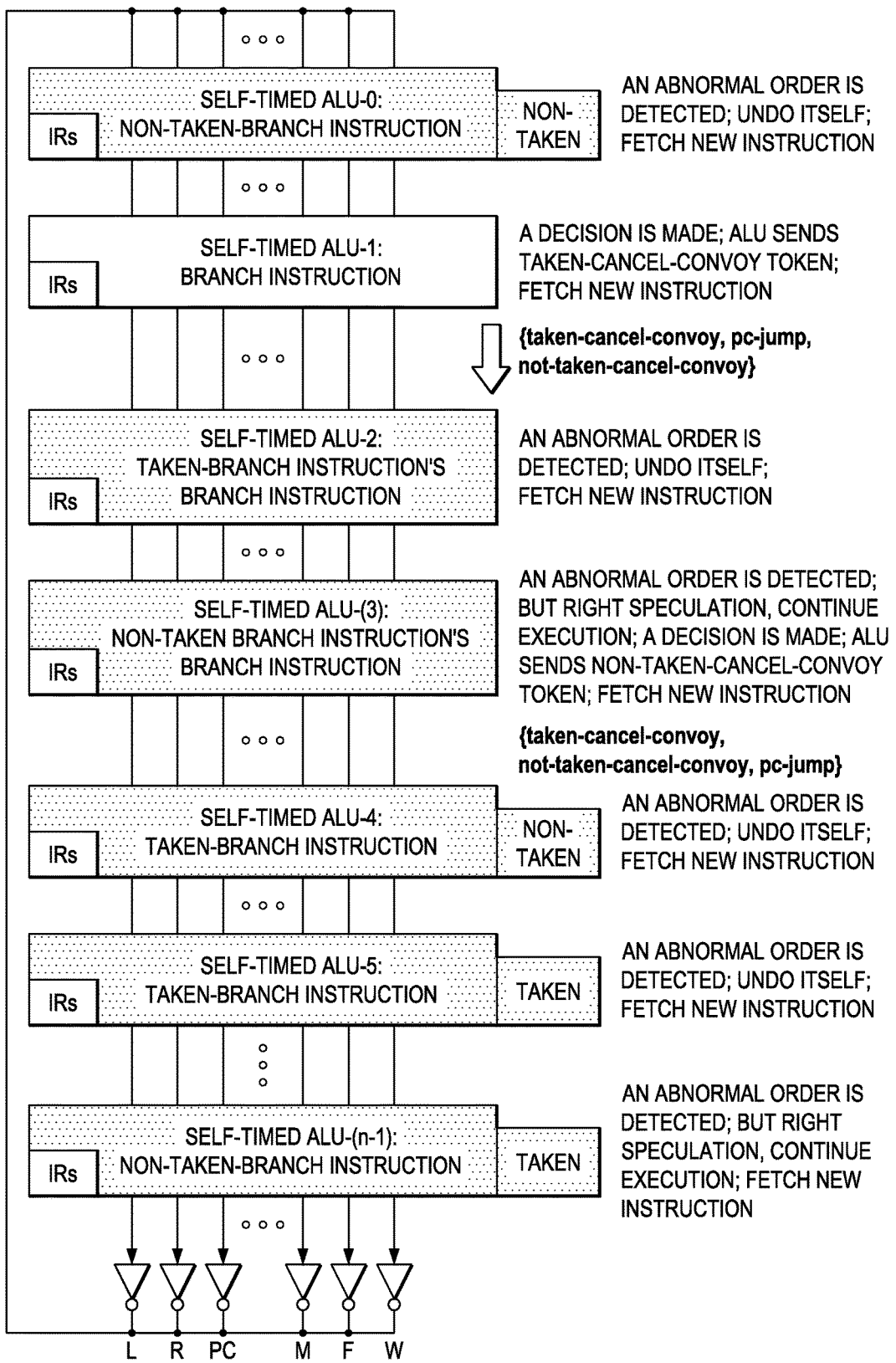
FIG. 15 illustrates an example of revoking incorrect speculation over speculation in accordance with an embodiment.

FIG. 15 illustrates an example of revoking incorrect speculation over speculation in accordance with an embodiment. The example shows a two level branch speculation over speculation, but the same principle can be applied to any multiple level branch speculation. At ALU-1, a branch instruction is executed. A decision to cancel at all levels the (nested) taken-branch instructions is made, and the ALU sends a taken-cancel assisted token, and fetches a new instruction. At ALU-2, the taken branch instruction's branch instruction (second level branch) is executed speculatively, and the abnormal order when receiving the taken-cancel token is detected. This causes the ALU to undo itself and fetch a new instruction. At ALU-3, the non-taken branch instruction's branch instruction is executed speculatively. The ALU also detects an abnormal order when receiving the taken-cancel token, but detects that the right speculation (non-taken branch) is made. Thus, ALU-3 continues execution and a decision to cancel all the second-level non-taken branch instructions is made. ALU-3 sends out a non-taken cancel assisted token and fetches a new instruction. At ALU-4, a first-level taken-branch instruction is executed speculatively, a taken-cancel assisted token is received first, and an abnormal order is detected causing the ALU to undo itself and fetch a new instruction. At ALU-5, a first-level taken-branch instruction is executed speculatively, a taken-cancel assisted token is received first, and an abnormal order is detected, causing the ALU to undo itself and fetch a new instruction. At ALU-(n−1), a first-level non-taken branch and second-level taken-branch instruction are executed speculatively. ALU-(n−1) receives first a taken-cancel assisted token, receives next a not-taken-cancel assisted token, and detects an abnormal order, but a right speculation is made (the correct two level branches are executed). ALU-(n−1) continues execution and fetches a new instruction. At ALU-0, a first-level non-taken branch and second-level non-taken branch instruction is executed speculatively. ALU-0 receives a taken-cancel assisted token first, detects an abnormal order, but also detects that the first-level speculation is right. ALU-0 then receives a non-taken cancel assisted token and detects an abnormal order, which causes the ALU to undo itself (undo the second level branch) and fetch a new instruction.

In the two level branch example above, two assisted tokens, one for indicating each correct branch, are issued and pass through the ALUs in addition to the master token (PC jump). In both revoking example of FIGS. 14 and 15, the assisted token is sent to indicate to the next logics beforehand the right branch executed at a previous logic and hence avoid, limit or reduce the number of flushes that would be needed in the case of incorrect branch speculations. This is one useful implementation of the assisted token architecture. However, the assisted tokens can be sent for other useful purposes or functions to signal ahead of time to next logics or ALUs that an action is required.

The system and method embodiments herein are described in the context of an ALU set in the asynchronous processor. The ALUs serve as instruction processing units that perform calculations and provide results for the corresponding issued instructions. However in other embodiments, the processor may comprise other instruction processing units instead of the ALUs. The instruction units may be referred to sometimes as execution units (XUs) or execution logics, and may have similar, different or additional functions for handling instructions than the ALUs described above. In general, the system and method embodiments described herein can apply to any instruction execution units configured in accordance with the master and assisted token processing logics and suitable to implement the embodiments herein.

Figure 16:
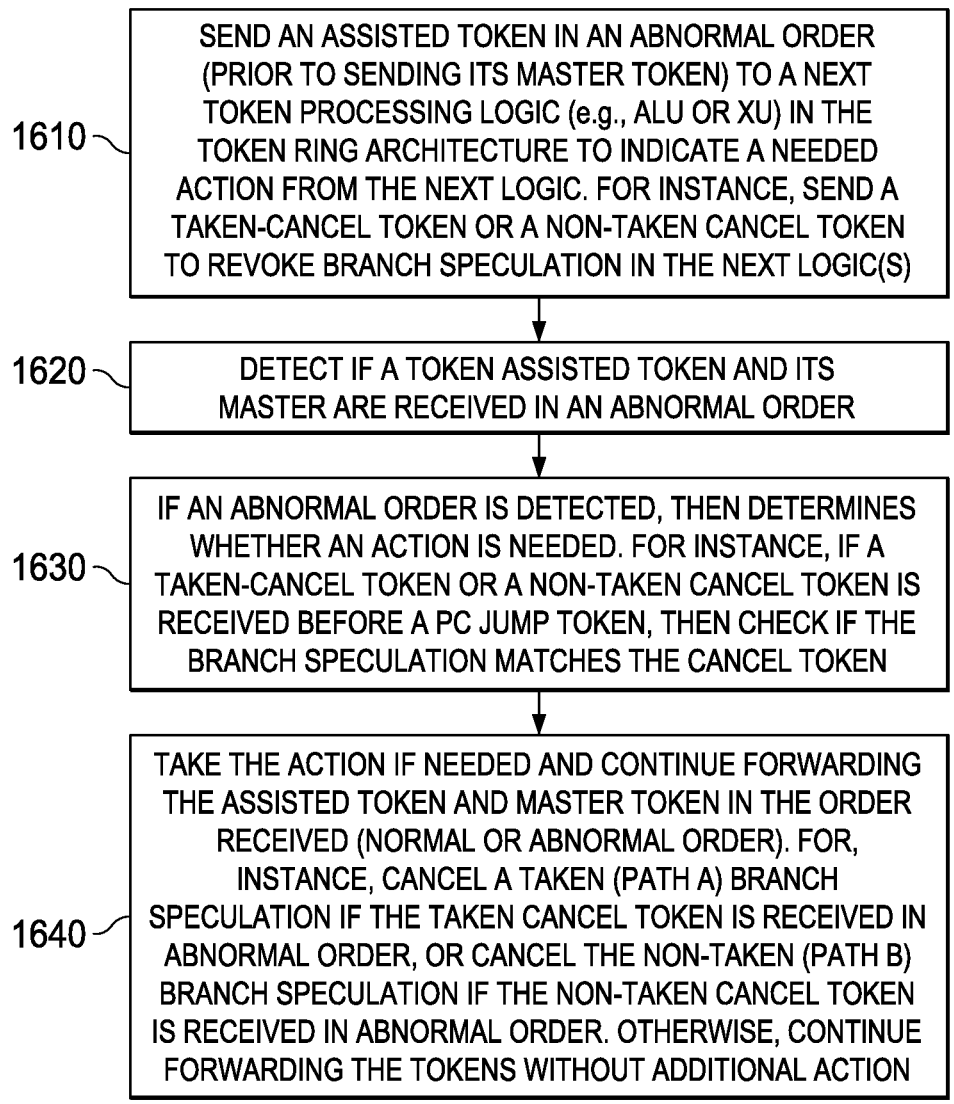
FIG. 16 illustrates an embodiment of a method applying master and assisted tokens in a token based asynchronous processor system.

FIG. 16 illustrates an embodiment of a method embodiment of a method applying master and assisted tokens in a token based asynchronous processor system. The method can be implemented using the embodiments above of the master and assisted token processing logics, e.g., using logic circuits. At step 1610, an assisted token is sent in an abnormal order (prior to sending its master token) from a token logic (e.g., ALU or XU) to a next token processing logic in the token ring architecture to indicate a needed action from the next logic. For instance, a taken-cancel token or a non-taken cancel token is sent by an ALU before its master token (PC jump token) to revoke branch speculation in the next logic(s). At step 1620, the logic detects if a token assisted token and its master are received in an abnormal order. For instance, the ALU also checks if it received itself master and assisted tokens in abnormal order. The steps 1610 and 1620 can be implemented in any order. At step 1630, if an abnormal order is detected, then the logic determines whether an action is needed. For instance, if a taken-cancel token or a non-taken cancel token is received before a PC jump token, then the ALU checks if the branch speculation matches the cancel token. At step 1640, the logic takes the action if needed and continues forwarding the assisted token and master token in the order received (normal or abnormal order). For, instance, the ALU cancels a taken (path A) branch speculation if the taken cancel token is received in abnormal order, or cancels the non-taken (path B) branch speculation if the non-taken cancel token is received in abnormal order. Otherwise, the ALU continues forwarding the tokens without additional action. In other embodiments, multiple assisted tokens may be used as described above for multiple master tokens of the token system.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method performed by an asynchronous processor, the method comprising:
   receiving, at an execution unit (XU), a master token associated with a resource and further receiving an assisted token for the master token; and
   upon determining that the assisted token and the master token are received in an abnormal order, detecting an operation status at the XU in association with the assisted token.

2. The method of claim 1 further comprising upon determining a needed action in accordance with the operation status and the assisted token, performing the needed action.

3. The method of claim 1 further comprising forwarding the assisted token and the master token in the abnormal order to a next XU.

4. The method of claim 1 further comprising upon determining that the assisted token and the master token are received in a normal order, forwarding, to a next XU, the master token and the assisted token in the normal order without additional action.

5. The method of claim 1, wherein the abnormal order corresponds to receiving, at the XU, the assisted token before the master token.

6. The method of claim 1 further comprising:
   determining, in accordance with a calculation at the XU, that a second action is needed by a next XU; and
   sending the assisted token and the master token in the abnormal order to indicate to the next XU that the second action is needed.

7. The method of claim 1 further comprising:
   receiving, at the XU with the master token, a second assisted token for the master token;
   upon determining that the second assisted token and the master token are received in an abnormal order, determining a second operation status at the XU in accordance with the assisted token; and
   upon determining a second needed action in accordance with the second operation status and the second assisted token, performing the second needed action.

8. The method of claim 1, wherein the XU is an arithmetic and logic unit (ALU).

9. The method of claim 1, wherein the XU is one of a plurality of XUs arranged in a token based ring architecture.

10. A method performed by an asynchronous processor, the method comprising:
    performing a branch speculation at an execution unit (XU);
    receiving, at the XU, a program-counter (PC) jump token and a cancel branch speculation assisted token for the PC jump token; and
    upon determining that the cancel branch speculation assisted token is received in an abnormal order with the PC jump token, detecting whether the cancel branch speculation assisted token corresponds to the branch speculation.

11. The method of claim 10 further comprising upon determining the cancel branch speculation assisted token corresponds to the branch speculation, revoking the branch speculation and fetching a new instruction at the XU.

12. The method of claim 10 further comprising forwarding the cancel branch speculation assisted token and the PC jump token to a next XU in the abnormal order.

13. The method of claim 10 further comprising upon determining that the cancel branch speculation assisted token and the PC jump token are received in a normal order, forwarding the cancel branch speculation assisted token and the PC jump token to a next XU in same received order without additional action.

14. The method of claim 10, wherein the abnormal order corresponds to receiving, at the XU, the cancel branch speculation assisted token before the PC jump token.

15. The method of claim 10 further comprising:
    determining, in accordance with a calculation at the XU, which branch action to be performed by a next XU; and
    sending, to the next XU, the cancel branch speculation assisted token corresponding to another branch speculation that is not needed at the next XU.

16. The method of claim 10 further comprising:
    performing, at the XU, a second level branch speculation corresponding to the branch speculation;
    receiving, at the XU, a cancel second level branch speculation assisted token for the PC jump token;
    upon determining that the cancel second level branch speculation assisted token is received in an abnormal order with the PC jump token, detecting whether the cancel second level branch speculation assisted token corresponds to the second level branch speculation; and
    upon determining the cancel second level branch speculation assisted token corresponds to the second level branch speculation, revoking the second level branch speculation and fetching a new instruction at the XU.

17. The method of claim 10, wherein the branch speculation is one of a plurality of possible branches to be performed at the XU, and wherein the cancel branch speculation assisted token is one of a plurality of cancel branch speculation assisted tokens corresponding to the plurality of possible branches.

18. An apparatus for an asynchronous processor comprising:
    a memory configured to cache a plurality of instructions; and
    a plurality of execution units (XUs) coupled to the memory and arranged in a token ring architecture, wherein each one of the XUs is configured to:
    receive an instruction of the instructions from the memory;
    receive a master token associated with a resource and further receive an assisted token for the master token; and
    upon determining that the assisted token and the master token are received in an abnormal order, detect an operation status for the instruction in association with the assisted token.

19. The apparatus of claim 18, wherein each one of the XUs is further configured to, upon determining a needed action in accordance with the operation status and the assisted token, perform the needed action.

20. The apparatus of claim 18, wherein each one of the XUs is further configured to:
- determine, in accordance with a calculation of the instruction, that a second action is needed by a next XU of the plurality of XUs; and
- send the assisted token and the master token in the abnormal order to indicate to the next XU that the second action is needed.

21. The apparatus of claim 18, wherein the plurality of XUs are a plurality of arithmetic and logic units (ALUs).

22. An apparatus for an asynchronous processor comprising:
- a memory configured to cache a plurality of instructions; and
- a plurality of execution units (XUs) coupled to the memory and arranged in a token ring architecture, wherein each one of the XUs is configured to:
  - receive an instruction of the instructions from the memory;
  - perform a branch speculation related to the instruction;
  - receive a program-counter (PC) jump token and a cancel branch speculation assisted token for the PC jump token; and
  - upon determining that the cancel branch speculation assisted token is received in an abnormal order with the PC jump token, detect whether the cancel branch speculation assisted token corresponds to the branch speculation.

23. The apparatus of claim 22, wherein each one of the XUs is further configured to, upon determining the cancel branch speculation assisted token corresponds to the branch speculation, revoke the branch speculation and fetch a new instruction.

24. The apparatus of claim 22, wherein each one of the XUs is further configured to:
- determine, in accordance with a calculation by the each one of the XUs, which branch action to be performed by a next XU of the plurality of XUs; and
- send, to the next XU, the cancel branch speculation assisted token corresponding to another branch speculation that is not needed at the next XU.

* * * * *